(12) United States Patent
Muthiah

(10) Patent No.: US 11,983,418 B2
(45) Date of Patent: May 14, 2024

(54) SECURITY INDICATOR ON A DATA STORAGE DEVICE

(71) Applicant: Western Digital Technologies, Inc., San Jose, CA (US)

(72) Inventor: Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 37 days.

(21) Appl. No.: 17/849,703

(22) Filed: Jun. 27, 2022

(65) Prior Publication Data

US 2023/0418477 A1 Dec. 28, 2023

(51) Int. Cl.
*G06F 3/06* (2006.01)
(52) U.S. Cl.
CPC ............ *G06F 3/062* (2013.01); *G06F 3/0629* (2013.01); *G06F 3/0658* (2013.01); *G06F 3/0679* (2013.01)
(58) Field of Classification Search
CPC .......... G06F 3/06; G06F 3/062; G06F 3/0629; G06F 3/0679; G06F 3/0658
See application file for complete search history.

(56) References Cited

U.S. PATENT DOCUMENTS

| | | | | |
|---|---|---|---|---|
| 7,069,580 B1 * | 6/2006 | Deitz | ................. | G05B 19/0428 713/168 |
| 7,565,685 B2 * | 7/2009 | Ross | ................... | G06F 21/6218 713/168 |
| 8,051,301 B2 * | 11/2011 | Barnes | ................ | G06F 12/1009 713/190 |
| 9,413,538 B2 * | 8/2016 | Baumann | .............. | H04L 9/3263 |
| 9,720,700 B1 * | 8/2017 | Brown | .................... | G06F 21/31 |
| 2004/0123118 A1 | 6/2004 | Dahan et al. | | |
| 2016/0042176 A1 | 2/2016 | Riahi | | |

(Continued)

FOREIGN PATENT DOCUMENTS

CN 113591086 A 11/2021

OTHER PUBLICATIONS

K. Butler, S. McLaughlin, T. Moyer and p. McDaniel, "New Security Architectures Based on Emerging Disk Functionality," in IEEE Security & Privacy, vol. 8, No. 5, pp. 34-41, Sep.-Oct. 2010.*

*Primary Examiner* — Pierre Michel Bataille
(74) *Attorney, Agent, or Firm* — Patent Law Works LLP

(57) ABSTRACT

A data storage device comprising a non-volatile storage medium configured to store user data, a data port configured to transmit data between a host computer system and the data storage device, a data security indicator, and a controller. The controller is configured to selectively control access of the host computer system to the user data based on security configuration data of the data storage device. The controller is further configured to respond to the occurrence of one or more operations, the operations being any of: (i) a data access operation requested or performed, by the host computer system, on the data storage device to access the storage medium via the data port; and (ii) a security control operation requested or performed, by an external device, on the data storage device to store, retrieve or update the security configuration data of the data storage device. The response of the controller includes generating an indicator control signal to cause the data security indicator to indicate one or more security parameters associated with the one or more operations.

20 Claims, 7 Drawing Sheets

(56) References Cited

U.S. PATENT DOCUMENTS

| | | | |
|---|---|---|---|
| 2016/0344773 A1* | 11/2016 | Knjazihhin | G06F 16/285 |
| 2017/0164201 A1 | 6/2017 | Li et al. | |
| 2018/0210844 A1 | 7/2018 | Kim | |
| 2019/0042128 A1* | 2/2019 | Tarango | G06F 11/3442 |
| 2021/0072911 A1* | 3/2021 | Kale | G06F 3/0619 |
| 2021/0406359 A1* | 12/2021 | Culshaw | G06F 3/0679 |
| 2023/0004290 A1* | 1/2023 | Klapman | G06F 3/0674 |
| 2023/0195912 A1* | 6/2023 | Saxena | H04L 9/3247 726/20 |
| 2023/0289089 A1* | 9/2023 | Mastenbrook | G06F 21/78 |
| 2023/0418498 A1* | 12/2023 | Peisakhov | G06F 3/064 |

\* cited by examiner

SECURITY INDICATOR ON A DATA STORAGE DEVICE

TECHNICAL FIELD

This disclosure relates to a data storage device with security functionality that is configurable by an external device, and that provides an indication of corresponding security parameters to a user of the data storage device.

BACKGROUND

Data storage devices (DSDs) are electronic devices with the capability to store information in the form of digital data. DSDs are typically deployed as an integrated part of, or as a removable component configured to interface with, a computing system for the purpose of improving the data transmission and storage capabilities of the system. From the perspective of the computing system, a DSD is typically implemented as a block storage device where the data stored is in the form of one or more blocks, being sequences of bytes or bits having a maximum length, referred to as block size.

External DSDs are commonly used to supplement the data storage capabilities of a computer system. For example, external DSDs are often standalone physical devices which house an internal storage component, such as a hard disk drive (HDD) or a solid state drive (SSD), that provides a host computing system with an additional portion of non-volatile memory (i.e., the volume of the drive) in which to store digital data. These external drive type devices are connectable to the host computer system via a data path operating over a particular connectivity protocol (e.g., via Universal Serial Bus (USB) cable). In response to being connected to the host computer system, the host computer system recognizes the external drive as a block data storage device such that a user of the device may access the storage of the drive via the data path (e.g., through operation of the host computer). Access to the drive typically enables a user to access (e.g., read, write and/or modify) user data stored on the drive.

The user data of a data storage device may be secured against access by unauthorized parties. The degree of security and the mechanisms used to secure the user data are often variable, for example in accordance with the intended use of the data storage device. Some storage devices provide status or state information to users about the functionality of the data storage device, including information about the security capabilities of the device and the data stored thereon.

SUMMARY

Disclosed herein is a data storage device comprising: a non-volatile storage medium configured to store user data; a data port configured to transmit data between a host computer system and the data storage device; a data security indicator; and a controller configured to: selectively control access of the host computer system to the user data based on security configuration data of the data storage device; and in response to the occurrence of one or more operations, the operations being any of: (i) a data access operation requested or performed, by the host computer system, on the data storage device to access the storage medium via the data port; and (ii) a security control operation requested or performed, by an external device, on the data storage device to store, retrieve or update the security configuration data of the data storage device, generate an indicator control signal to cause the data security indicator to indicate one or more security parameters associated with the one or more data access and security control operations.

In some embodiments, the controller is configured to: receive a request for a data access operation from the host computer system to access user data of the storage medium; process the request and the security configuration data to determine: i) one or more data-access security parameters to be indicated to the user; and ii) a corresponding indicator component of the data security indicator to perform the indication; and generate an indicator control signal to cause the determined indicator component to indicate the determined data-access security parameters.

In some embodiments, the at least one security parameter associated with the data access operation comprises one or more of: a security state of the user data, wherein the security state is either: a secure state in which the user data is logically protected; or a non-secure state in which the user data is logically unprotected; and a type of the data access operation, wherein the type is either: a read type in which the user data is read from the storage medium by the data access operation; or a write type in which the user data is written to the storage medium by the data access operation.

In some embodiments, the data storage device further comprises a cryptography engine connected between the data port and the storage medium, and wherein the controller is configured to: in response to selectively setting the security state of the user data to the secure state: instruct the cryptography engine to use an encryption key to perform a encryption function to selectively encrypt the user data; and in response to selectively setting the security state of the user data to the non-secure state: instruct the cryptography engine to use a decryption key to perform a decryption function to selectively decrypt the user data.

In some embodiments, the controller is configured to: receive a request for a security control operation from a device security application executing, at least partially, on a processor of the external device; and process the received request to store, retrieve or update one or more values of the security configuration data of the device, and to determine: i) one or more device-level security parameters to be indicated to the user; and ii) a corresponding indicator component of the data security indicator to perform the indication; and generate an indicator control signal to cause the determined indicator component to indicate the determined device-level security parameters.

In some embodiments, the data storage device is configured to communicate with the device security application of the external device via a secure wireless communication channel.

In some embodiments, the determined device-level security parameters include one or more of: an access state of the data storage device; a connection state of the secure wireless communication channel; and an activation state of one or more security functions of the device security application with respect to the data storage device.

In some embodiments, the one or more security functions of the data storage device comprise: a location sharing function configured to transmit location data of the data storage device to the external device; and a data protection function configured to generate record data representing the utilization of the storage medium of the device.

In some embodiments, the data security indicator includes one or more display components configured to visually represent at least one security parameter.

In some embodiments, the security configuration data includes a display component mapping assigning the at least one security parameter to a corresponding display component, such that the corresponding display component visually represents values of at least one security parameter.

In some embodiments, the one or more display components are configured to: display an element indicating the value of a represented security parameter; and change the displayed element in response to a voltage applied to the display component.

In some embodiments, the generation of the indicator control signal by the controller comprises: determining the value of the represented security parameter; determining an indication element corresponding to the represented security parameter based on a mapping of, at least, the set of possible security parameter values to associated discrete values with corresponding elements; and determining a voltage to apply to the display component to change the displayed element to the indication element.

In some embodiments, the data storage device further comprises an indicator control circuit configured to control the operation of the one or more display components to indicate the represented security parameters for an indication duration.

In some embodiments, the controller is configured to set the indication duration of a data access operation to be shorter than the indication duration of a security control operation.

In some embodiments, the display component is a light emitting diode (LED) configured to selectively display one or more colors, and wherein the indicator control circuit is configured to, in response to receiving the generated indicator control signal: apply the determined voltage to the LED to change a displayed color of the LED to an indication color; and cease application of the determined voltage to the LED after the lapsing of the indication duration being a period of time commencing on the change of the displayed color to the indication color, such that, on cessation of the application of the determined voltage to the LED, the indicator control circuit causes the LED to assume an off state in which no color is displayed.

In some embodiments, on cessation of the application of the determined voltage to the LED, the indicator control circuit is configured to apply a pre-specified voltage to cause the LED to change the displayed color to: an auxiliary color, wherein the auxiliary color not does correspond to any color of the set of possible security parameter values.

In some embodiments, the display component is a surface having an electrochromic material configured change the displayed element in the form of a color of the surface in response to a voltage applied to the material to indicate the value of the represented security parameter, and wherein the indicator control circuit is configured to: apply the determined voltage to the electrochromic material to change a displayed color of the surface to an indication color; cease application of the voltage to the electrochromic material after change of the color of the surface to the indication color, such that the color changing surface of the electrochromic material is configured to retain the indication color after cessation of the application of the voltage.

In some embodiments, the display component is a display panel configured to display an electronic label on a substrate in response to a voltage applied to one or more regions of the substrate, where the label indicates the value of the represented security parameter.

Disclosed herein is a method for providing security indications of a data storage device, the method executed by a controller of the device and comprising: selectively controlling access of a host computer system to user data stored on a non-volatile storage medium of the data storage device based on security configuration data of the data storage device; and in response to the occurrence of one or more operations, the operations being any of: (i) a data access operation requested or performed, by the host computer system, on the data storage device to access the storage medium via the data port; and (ii) a security control operation requested or performed, by an external device, on the data storage device to store, retrieve or update the security configuration data of the data storage device, generating an indicator control signal to cause a data security indicator of the data storage device to indicate one or more security parameters associated with the one or more operations.

Disclosed herein is a data storage device comprising: means for storing user data; means for transmitting data between a host computer system and the data storage device; means for indicating a set of parameters; and means for selectively controlling access of the host computer system to the user data based on security configuration data of the data storage device; and means for, in response to the occurrence of one or more operations, the operations being any of: (i) a data access operation requested or performed, by the host computer system, on the data storage device to access the means for storing user data via the means for transmitting data between a host computer system and the data storage device; and (ii) a security control operation requested or performed, by an external device, on the data storage device to store, retrieve or update the security configuration data of the data storage device, generating an indicator control signal to cause the means for indicating a set of parameters to indicate one or more security parameters associated with the one or more operations.

BRIEF DESCRIPTION OF DRAWINGS

Some embodiments are described herein below with reference to the accompanying drawings, wherein.

DESCRIPTION OF EMBODIMENTS

Figure 1A:
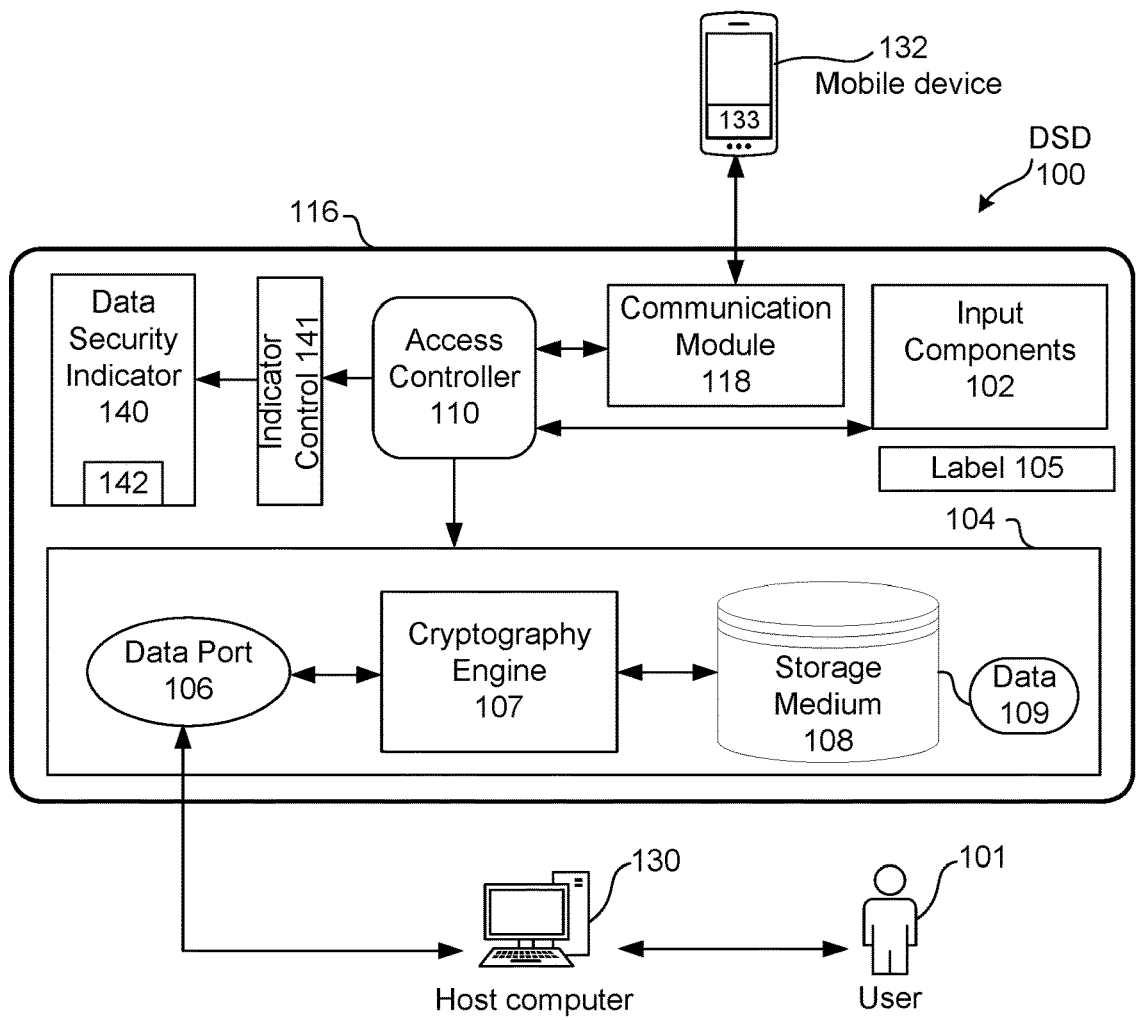
FIG. 1a illustrates an example data storage device (DSD), in accordance with some embodiments.

There are a variety of different approaches for securing the user data of a data storage device (DSD). Conventional approaches include maintaining a single global security parameter, or state, that controls the extent to which all user data of the DSD is accessible or useable. Accessibility of the user data in this context relates to ability of a connected device (e.g., a host computer system) to physically extract user data stored on the internal drive of the DSD, or to write user data to the drive. Therefore, one way in which user data of the DSD may be secured is by rendering the data inaccessible, such as by physically disabling any flow data between the storage medium of the DSD and the host. Alternatively, or in addition, securing the user data may involve obscuring the data as it is stored on, or retrieved from, the DSD (e.g., using an encryption function).

Although, protection may be achieved by applying this type of security configuration, whereby the device controller selectively sets a global or device-level restriction, for example by "locking" or "unlocking" the device for any data storage or retrieval activity, it is often desirable for the DSD to provide a more granular level of security. For example, it may be desirable to implement a security configuration in which the DSD permits the unprotected (i.e., unencrypted or un-encoded) use of some of the stored user data, such that a user may perform data access operations on the user data (e.g., to read, write and/or modify the data). Simultaneously, it may be desired to enforce a higher degree of protection on some other user data, such as to permit access to only a protected (or "secured") form of the other user data, or to ensure that data received in a write-type data access operation is stored in the secured form.

In an attempt to address this issue, some vendors have designed a DSD that implements a security configuration controlled, at least in part, by a security software application. The DSD, connected host, and software application form an integrated security platform, where the application is typically executed on an external computing device, such as a mobile device. The security software application is configured to communicate security information to the DSD, such as for example in the form of control data and parameters related to security functions enabled by the security application with respect to the DSD.

The use of a security application provides the user with a greater degree of flexibility in controlling and implementing a security configuration for the DSD. For example, the user may be able to define desired security functionality of the DSD in relation to: a global or default access state; a security type of particular data stored in, or retrieved from the internal drive; and particular partitions of the memory space of the internal drive and any associated security requirements (such as encryption) for accessing one or more of these partitions.

Despite the benefits of improved security capabilities, the ability to dynamically configure the security settings of a DSD introduces issues with providing useful information to a user about the security configuration of the DSD. Previous approaches to providing users with feedback on the security of the DSD using "on-device" components, such as a display screen, are limited in accordance with the corresponding security capabilities.

For example, providing an indication of a physical access state representing the current security of the device is only appropriate when all data is subject to the same security policy, which has drawbacks as discussed above. As a result, for security configurations which permit the definition of granular levels of security for different user data, there is a desire to provide users with a degree of security feedback that is aligned with the dynamic and real-time nature of the data access operations made by the user via the connected host. Furthermore, the previous approaches to the "on-device" provision of security information do not allow for the simultaneous reporting of both data access and security control related information. It is therefore desired to provide a data storage device that ameliorates one or more of these difficulties, or other difficulties, of the prior art or that at least provides a useful alternative.

With reference to FIG. 1a, there is disclosed an exemplary data storage device (DSD) 100 that is configured to selectively control access of a connected host computer system to user data stored in a storage medium of the DSD 100, and to (i) detect operations, such as for example to access the user data and/or to set security functionality of the DSD; and (ii) provide the user with corresponding security characteristic information in response to and associated with the operation(s) via a data security indicator (DSI) 140 of the device 100. In the described examples, the detected operations are: data access operations made by a user 101 of the device 100, via the host computing system 130, to user content data 109 stored by the device 100; or security control operations requested or performed, by an external device 132, on the data storage device 100 to store, retrieve or update security configuration data of the data storage device 100.

The DSD 100 indicates the security characteristic information by representing (e.g., visually) the value of one or more security parameters. That is, in response to one or more of any of a data access operation of the host 130, and security control operation of an external device, the DSD 100 indicates values of security parameter(s) that are associated with the respective data access and/or security control operations. In some embodiments, the security parameters indicated are configurable, as determined at least in part by the security configuration data of the device 100.

The DSD 100 provides security characteristic information to the user 100 dynamically, in accordance with the use of the device, by controlling the operation of various indication components (e.g., visual display elements) to cause indications of particular values of the security parameters (e.g., a type of access operation, or a security state of the data accessed). Specifically, the DSD 100 generates control signals to cause the represented security parameters to be indicated, via the DSI, concurrently in real-time, or in substantially real-time, with the corresponding occurrence of the data access or security control operation.

The DSI 140 is a visual indicator in the described embodiments, configured to visually represent one or more security parameters to the user 101. In some examples, the DSI 140 includes one or more display components configured to display a particular visual representation of a security parameter (e.g., a security state of accessed user data).

In some configurations, the security parameters are indicated for an duration that varies according to the nature of the corresponding operation (i.e., whether the security parameter value relates to the occurrence of a data access operation or a security control operation). For example, values of the security parameters associated with a data access operation may be indicated over a short duration (e.g., a flash of light emitted from a visual display element, or a short burst of sound from a speaker component) since the access operation itself occurs over a short duration of time. Exemplary security parameters related to data access operations may include: a security state of the user data, being a "secure" state in which the user data is logically protected, or a "non-secure" state in which the user data is logically unprotected.

By contrast, the security characteristics associated with security control operations are relevant to the user for a longer period of time. For example, security control parameters maintained by the DSD 100 may include a connection state of a communication channel established between the external device 132 and the data storage device 100, and an activation state of one or more security functions of the data storage device 100. In some examples, the control signals are generated to cause the security parameter values of the security control operation(s) to be indicated over a longer duration compared to the values representing the data access operation(s). This reflects the generally persistent nature of security control information over a period of user interaction with the device 100 (e.g., a session for which the host 130 is connected with the device 100) compared to the data access information (which is associated with operations that each occur over microseconds).

In some embodiments, the DSD 100 is configured to provide security indications for a plurality of data access and/or security control operations. The device controller may aggregate or collect a set of security parameter values, for example as resulting from corresponding sets of data access operations, and produce a single display component indication representing the values. For example, the device controller may log the type of the data access operations (i.e., 'read' or 'write') and/or the security state of the accessed data, for all operations performed over an observation window of a pre-specified duration (e.g., 500 ms). The median, or average or most commonly observed state value may be indicated to provide a representation of the security parameter over the observation window.

In some examples, the DSD 100 is configured to selectively determine the use of particular display components to represent particular security parameters, for example based on the desired duration of the indication of the security parameter values and the display properties of the display components. Some examples of the DSI 140 include persistent components configured to retain the visual representation in the absence of an external power source (e.g., electrochromic surfaces). This provides an advantage in enabling the DSD 100 to maintain the visual representation of particular data access or security information in the absence of a supply of power, such as following disconnection of the DSD 100 from the host 130.

The DSD 100 is configured to communicate with a data security application (DSA) executing, at least partially, on a processor of the external device. In some examples, the communication between the DSD 100 and the external device executing the DSA is via a secure communication channel, such as a Bluetooth wireless connection or physically (e.g., via USB). The user 101 issues security control operations to the DSD 100, via the DSA, to customize the security functionality of the DSD 100. For example, the DSA may provide security configuration data values to the DSD 100 as part of a security control operation, enabling the DSD 100 to update its corresponding security configuration data. In response to a security control operation, the DSD 100 may set, retrieve or update the security configuration data, perform a related security function of the DSD 100, and determine the security parameter values to indicate to the user, such as for example the activation state of the performed security function.

The use of a data storage device with the security indication functionality described herein may provide advantages over conventional approaches, including: i) providing an increased level of security information to the user of the device, such as via a visual representation of security related parameter data extending beyond an indication of a global locked/unlocked device access state; ii) the security information relates to the dynamic use of the device by the user, including the data accessed by the user and commands performed to customize the security functionality; iii) the security characteristic information is provided in response to the data access and security control operations in real-time as the operations are performed; iv) in the case of visual security indications, the use of hardware control circuitry to modulate the duration of the indication based on the lifespan or temporal relevance of the security information; and v) further improving on advantage (iv) by utilizing a combination of display components with fast and transient, and slow and persistent, responses to indicate parameters for respective data access and security control operations.

Therefore, the data storage devices described herein provide an improved solution for indicating security parameters to a user of the data storage device, where the indications are provided dynamically and contemporaneously with the activities of the user, including data access operations performed to store or retrieve user data, and security control operations performed, via an external device, to configure the security functions of the data storage device.

Secure Data Storage Device

FIG. 1a shows an embodiment of the DSD 100 comprising a data path 104 and an access controller 110. The data path 104 comprises a data port 106 configured to transmit data between a host computer system 130 and the DSD 100. The DSD 100 is configured to register with the host computer system 130 such as to provide functionality to the host computer system 130 of a block data storage device. DSD 100 further comprises storage medium 108 to store user content data 109. The user content data 109 includes one or more blocks of data organized into files, for example including images, documents, videos, etc., according to a particular file system operable by the host computer 130.

The storage medium 108 is non-transitory such as to retain the stored block data irrespective of whether the medium 108 is powered. The medium 108 may be a hard disk drive (HDD) with a rotating magnetic disk or a solid state drive (SSD) and its variations like SLC (Single Level Cell), eMLC (Enterprise Multi Level Cell), MLC (Multi Level Cell), TLC (Triple Level Cell), and QLC (Quadruple Level Cell), and combinations of the above such as SSHD. Any other type of non-volatile storage media may also be used, including emerging non-volatile memory such as Program in Place or Storage Class Memory (SCM), such as ReRam, PCM, and MRAM. Further, the storage medium 108 may be a block data storage device, such that the user content data 109 is written in blocks to the storage medium 108 and read in blocks from the storage medium 108.

The host computer system 130 is configured to include a device driver and a data/power interface for communicating with the DSD 100 and providing it with power. The data and power interface operates over data port 106, which may be implemented as, for example, some form of USB port (e.g., USB-A, USB-8, USB-C, mini-USB, micro-USB, etc.), a Thunderbolt port, a Power over Ethernet (PoE) port, or a similar port.

In some embodiments, the DSD 100 includes a cryptography engine 107 configured to receive, interpret and execute commands received from host computer system 104 according to a predetermined command set, such as for example the standard Advanced Technology Attachment (ATA) or serial ATA (SATA) and/or ATA Packet Interface (ATAPI) command set, which is available from Technical Committee T13 noting that identical functionalities can be implemented within Trusted Computing Group (TCG) Opal, Small Computer System Interface (SCSI) and other proprietary architectures.

The cryptography engine 107 is connected between the data port 106 and the storage medium 108 and is configured to use a cryptographic key to encrypt user content data 109 to be stored on the storage medium 108, and to decrypt the encrypted user content data 109 stored on the storage medium 108 in response to a request from the host computer system 130. That is, the access controller 110 issues commands to the data path components to cause the cryptography engine 107 to control the form of the user content data 109 (i.e., encrypted or plain). For example, the access controller 110 may provide a key to the data port 106, which the data port 106 then forwards to the cryptography engine 107 via a SECURITY SET PASSWORD command of the ATA SECURITY feature set.

In one example, the cryptography engine 107 encrypts the user content data "on the fly" as it passes through cryptography engine 107 from data port 106 to storage medium 108, and decrypts the encrypted user content data "on the fly" as it passes through the cryptography engine 107 from storage medium 108 to data port 106.

The access controller 110 is configured to provide data access functionality to the host computer system 130 by controlling the data path 104 and facilitating the transmission of user content data 109 between the host computer system 130 and the non-volatile storage medium 108 via the data port 106. Data is transferred between the storage medium 108 and the host 130 via a data access operation requested, and subsequently performed, by the host 130 on the DSD 100. A data access operation may include: a data read operation, in which user data is read from the storage medium 108; or a data write operation, in which user data is written to the storage medium 108, on successful completion of the operation.

The access controller 110 is configured to maintain security configuration data representing a security configuration of the DSD 100. The security configuration data may include data-access security parameters that provide security information associated with the data access operations performed on the DSD 100. For example, the data-access security parameters may include but are not limited to: a security state of the user data associated with a data access operation; and a type of the data access operation (e.g., 'read' or 'write').

The security state (or "security type") of user data represents the extent to which the data is logically protected. Particular user data stored to, or retrieved from the storage medium 108 is of: a "secure" type or state if the data is in an encrypted, encoded, or otherwise obfuscated form; or a "non-secure" type or state if the data is in a plain or unprotected form.

In some examples, the logical protection of user data in the "secure" state may be enforced by the DSD 100. For example, the DSD 100 may operate in a "restricted" cryptographic mode in which the cryptography engine 107 uses a cryptographic key to selectively encrypt the plain form of one or more of: the user content data 109 stored on the storage medium 108; and data received from the data port 106 to be stored as user content data 109 on the storage medium 108. That is, in the restricted mode all user data read by the host 130 from, or written by the host 130 onto, the storage medium 108 is of the "secure" type. In an "unrestricted" cryptographic mode, cryptography engine 107 uses a cryptographic key to selectively decrypt the encrypted form user content data 109 stored on the storage medium 108, such that the user data read by the host from the medium 108 is non-secure.

The cryptographic mode of the DSD 100 is determined by cryptographic key used by the cryptography engine 107. In some configurations, the cryptography engine 107 performs encryption and decryption operations with a particular prespecified user key associated with the user 101. For example, the user key may be set during a configuration step conducted by the user 101 and maintained by the controller 110 as part of the security configuration data. In other configurations, the DSD 100 may be configured to obtain the user key via a key transfer process, or to derive the user key in response to the authentication of the user 101 with the DSD 100.

The security state of particular user data stored by, or retrieved from, the storage medium 108 as part of an access operation is independent of the physical access state. That is, the DSD 100 may enable transmission of data through the path 104, independently to whether the data retrieved from, and stored into, the storage medium 108 is in an encrypted, encoded or obfuscated (as performed by the cryptography engine 107, or otherwise). Further, the security state of particular user data passing through the data path 104 is dependent on the corresponding data access operation (e.g., on the actual data that is read/written) performed by the host 130, and is determined dynamically in response to the data access operation (i.e., rather than existing as a static device-level setting).

The data access security parameters may also include a type of the data access operation, being either: a read type in which the user data is read from the storage medium by the data access operation; or a write type in which the user data is written to the storage medium by the data access operation.

In some examples, the DSD 100 is configured to provide the user with security information by indicating the value of multiple security parameters associated with a data access operation. For example, for a storage medium 108 configured to store both secure and non-secure types of user data, host 130 may perform a read-type data access operation to retrieve secure user data from medium 108. In response, the controller 110 operates the DSI 140 to indicate the "secure" and "read" values of the 'security state' and 'data access type' parameters respectively. Similarly, in response to the host 130 performing a write-type data access operation to store non-secure user data to the medium 108, the controller 110 may operate the DSI 140 to indicate the "non-secure" and "write" values.

The security configuration data may also include device-level security parameters that provide security information associated with the security control operations performed on the DSD 100. In some examples, the DSD 100 has one or more security features that provide a global level of security for the DSD 100, irrespective of the data access operations performed. For example, the device-level security parameters may include, may are not limited to: an access state of the DSD 100; and a security level of one or more partitions of the memory space of the storage medium 108.

The access state of the DSD 100 represents the state of the data path 104, as either enabling or disabling data transmission between the storage medium 108 and the host 130 (i.e., also referred to as the physical access state of the DSD 100). In some examples, the controller 110 is configured to selectively set the access state of the DSD 100 to: an unlocked state to enable access to the user content data 109; or a locked state to disable access to the user content data 109. In such implementations the access state corresponds to a "physical access mode" of the DSD 100 which controls whether the host 130 can exchange data in any form (i.e., irrespective of the logical protection) with the DSD 100.

In some examples, the storage medium 108 is formed from a set of one or more partitions that logically define corresponding distinct addressable areas of accessible memory space (the "memspace" of the medium 108). The controller 110 may be configured to maintain an indication of a particular level of security ("partition security level") for one or more of the defined partitions. The partition security level controls the degree of logical protection of a particular partition. For example, the controller 110 may restrict access to a partition with a "secure" partition security level subject to the authorization of the device attempting access (e.g., host 130). In some examples, controller 110 is configured to indicate the partition security level of the partition associated with a data access operation (i.e., the partition where the corresponding data is to be stored to or retrieved from) instead of the security state of the user data.

The DSD 100 includes a communications module 118, which may include transceivers and/or physical interfaces configured to enable a connection between the DSD 100 and the external device 132, for example via a wireless or wired transmission media. In the described embodiments, the communication module 118 is configured to implement a secure wireless communication channel between the DSD 100 and the external device 132 (e.g., via the use of one or more Bluetooth protocols) for direct wireless communication with the external device 132. In some embodiments, the communications module 118 also implements the IEEE 802.xx family of protocols for wired or wireless communication external device 132 over one or more communications networks (e.g., including one or more LANs, WANs, and/or Internet networks).

In some examples, the security functions of the DSD 100 may be controlled by a device security application (DSA) 133 executing, at least partially, on a processor of an external computing device 132. The device-level security parameters associated with the security control functionality of the DSA 133 may include, may are not limited to: a connection state of the communication channel between the DSD 100 and an external computing device 132 (i.e., to indicate a transfer of data); and an activation state of one or more remote security functions of the DSA 133 with respect to the DSD 100. Exemplary device-level remote security functions of the DSD 100 may include: a location sharing function configured to transmit location data of the DSD 100 to the external device 132; and a data protection function configured to generate record data representing the utilization of the storage medium 108 of the device 100 at a pre-specified time. The data protection function may be a backup function configured to record an image of the user data stored on medium 108 at the pre-specified time, or a snapshotting function configured to record an instance (or "snapshot") of the state of the device 100 (i.e., including both user data, and any other control or system or data maintained by the device, such as the security configuration data).

The controller 110 may receive updated security configuration data values via a security control operation requested and performed by the DSA 133 executing on the external device 132. In response, the controller 110 processes the received updated security configuration data to selectively set the values of the security parameters of the device as appropriate, thereby modifying: (i) the data specific security characteristics (i.e., the data-access security parameters); and/or (ii) the global security characteristics (i.e., the device-level security parameters), of the DSD 100. In other cases, the security control operation may request that the DSD 100 provide the DSA 133 with security configuration data values presently maintained by the device 100. In response, the controller 110 processes the security control operation to selectively retrieve the appropriate values of the security configuration data (e.g., from memory 114), and generates and transmits the values to the DSA 133 via the communication channel.

The DSD 100 includes an enclosure 116 configured to physically house the components of the device 100. The enclosure 116 is formed from a rigid, or semi-rigid, material with particular properties (e.g., electrical resistance and impact strength) suited to protecting the internal components of device 100. For example, the material of the enclosure 116 may include a polycarbonate (PC), an acrylonitrile butadiene styrene (ABS), an acrylic, a thermoplastic polyester, a metal, or a combination of any of these.

In some examples, the data storage device 100 includes one or more input components 102 configured to accept an input from the user 101. For example, the input components 102 may include a set of buttons, or a similar arrangement of mechanical components that collectively enable the entry of input into the device 100.

In some examples, the user 101 operates the input components 102 to change one or more values of the security configuration data. For example, the user 101 may actuate a button component 102 to cause the controller 110 to establish a secure wireless communication channel between the device 100 and external device 132.

In some examples, the DSD 100 includes a label or key or other security value 105 utilized by user 101 to operate the DSA 133 in relation to the device 100. For example, the label 105 may be a QR code, and the user 101 may register or enroll the DSD 100 with the DSA 133 by entering the label 105 into the DAS 133 (e.g., via a QR scanner application executing on the device 132). In some implementations the label 105 is affixed to the enclosure 116 (e.g., on the bottom surface), and this is advantageous in ensuring that only a user 101 who is physically in possession of the DSD 100 may utilize the DSA 133 to exercise remote control over the security functionality.

The DSD 100 includes at least one data security state indicator (DSI) 140 configured provide the user 101 with an indication of values of the one or more security parameters of the DSD 100. The DSI 140 has sub-components including one or more display components 142 capable of visually displaying at least one security parameter to user 101. The DSI 140 also includes an indicator control circuit 141 configured to interface with the access controller 110 and drive the display components 142 in response to an indicator control signal. In some examples, the display components 142 are integrated, at least partially, into the housing or enclosure 116 of the DSD 100.

In the described examples, the display components 142 include a color display component configured to: display a color; and change the displayed color in response to a voltage applied to the color display component, by the indicator control circuit, to indicate the value of a represented security parameter. Different exemplary DSDs 100 may implement a different configuration of the display components 142, including for example one or more: light emitting diodes (LEDs) and/or liquid crystal display (LCD) panels, or a combination thereof. In some embodiments, the display components 142 include one or more elements, such as color changing surfaces or bi-stable panels, that are configured to retain a persistent visual representation in the absence of power (i.e., when the device 100 is not receiving power through the data port 106, due to a disconnection of the host 130).

The indicator control circuit is configured to control the operation of the one or more display components to achieve an indication of the represented security parameter(s) that varies in duration with the corresponding occurrence of the data access or security control operation. The DSD 100 is configured to map security parameters for indication by particular display components 142 in order to achieve a desired transient or persistent visual response (e.g., indicating data security state and access type via LEDs).

Figure 1B:
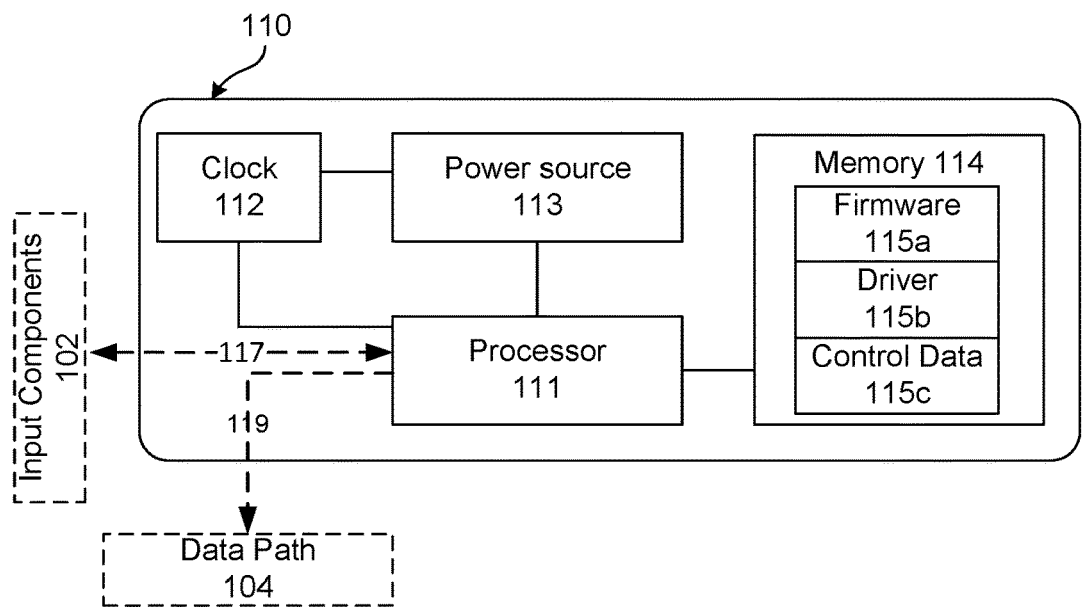
FIG. 1b illustrates a block diagram of an access controller of the example DSD, in accordance with some embodiments.

FIG. 1b illustrates an exemplary embodiment of the access controller 110 which includes: a processor 111; a clock 112 in communication with the processor 111; memory modules in the form of a system memory 114, and a firmware 115, configured to exchange data with the processor 111 and a power source 113 configured to power, at least, the processor 111 and the clock 112. In some examples, the power source 113 is an internal battery configured to supply power exclusively to components of the access controller 110. In some examples, the power source 113 may be a rechargeable battery configured to accept input power from the data port 106.

The processor 111 is configured to execute program code stored within the system memory 114 to issue commands for controlling the operation of the DSD 100. The function of the processor 111 includes, but is not limited to, generating: an enable signal, and a corresponding disable signal, to control data transmission through data path 104; cryptography engine control signals to direct the encryption or decryption of the user content data 109 by cryptography engine 107; and indicator control signals to control the operation of the DSI 140, as described herein below.

Processor 111 is configured to receive input data from data path 104 and input components 102 via flows 119 and 117 respectively. For example, processor 111 generates enable and/or cryptography engine signals in response to the a change in the cryptographic mode of the device 100. Processor 111 generates and transmits control signals to the device components, such as input components 102 or components of the DSI 140. Processor 111 receives a clocking signal from clock 112, which is processed to produce timestamp values representing instants in real-time that are used by the access controller 110 (e.g., by the user authentication process).

The system memory 114 stores device specific data, including at least a unique identifier of the DSD 100, referred to as the device identity key (IDK), and the security configuration data, including the one or more device-level security parameters, of the DSD 100. For example, the configuration data stored in memory 114 may include values for the access state, represented by a binary variable with value '0' or '1' representing the "unlocked" and "locked" states of the device 100 respectively.

The cryptographic mode of the DSD 100 and the security level of each partition may be similarly respectively represented by: a data cryptography variable (i.e., '0' indicating the unrestricted mode in which data is stored to, and retrieved from, the medium 108 as plain data, and '1' indicating the restricted mode in which data is stored to, and retrieved from, the medium 108 as encrypted data), and a partition security variable (i.e., '0' indicating a non-secure partition holding unprotected data, and '1' indicating a secure partition holding encrypted data).

In examples where a user authentication process is performed, for example to change one or more device-level security parameters of the DSD 100 such as the access state, the system memory 114 is configured to store authentication data of the device 100. The authentication data may include one or more of: passcode data representing a passcode to authenticate the user 101 of the DSD 100; device key data representing a unique key of the DSD 100 that is exclusively provided to an authorized user of the DSD 100; and any other data required by the device 100 to perform user authentication.

In some embodiments, the system memory 114 also includes: a firmware 115a; and one or more drivers 115b for implementing the security indication functionality described herein. The firmware 115a and drivers 115b may be stored in a separately partitioned area of system memory 114, or in one or more dedicated hardware modules, such as caches, registers, or a combination of these.

The processor 111 is configured to execute the firmware 115a and drivers 115b to control the indication of the security parameters to the user 101. Firmware 115a has associated indicator control data 115c for controlling the display components 142 according to their type and form. For example, the indicator control data of a DSI 140 including a color changing component (e.g., an electrochromic material) may specify color data representing a plurality of colors which may be assumed by the component (e.g., the color changing surface). In another example, the indicator control data 115c may specify label data representing labels that may be rendered on the display panel of the DSI 140 (e.g., by a LCD, LED or bi-stable display panel).

In some examples, the firmware 115a includes one or more routines or functions, in the form of program code executable by the processor 111, to: 1) determine the value (s) of the one or more security parameters that are to be indicated by the display components; and 2) determine a mapping of the determined security parameter values to display values (e.g., representing particular colors, labels, images, or other elements) of the display components to perform the indication operation. For example, to indicate a device-level security parameter, such as the access state of the DSD 100, the value of the parameter is first retrieved from the security configuration data stored in memory 114 (e.g., '0' for the unlocked state, or '1' for the locked state). Then, the determined value is indexed into a mapping for the parameter (e.g., the access state) and display component (e.g., an LED panel table), as maintained by the firmware 115a to determine the display data specifying the display components and values (e.g., LED identifier and corresponding color/label data).

To indicate a data-access security parameter, the processor 111 determines the value(s) of one or more security parameters that are to be indicated dynamically in response to the occurrence of the corresponding data access operation. Processor 111 executes an indication parsing routine of firmware 115a to process the data access operation, in real-time with the occurrence of the operation, to determine the values of one or more data-access security parameters associated with the operation. For example, the indication parsing routine may return values for the security state and access type parameters in response to a request to read user data.

In some implementations, the indication parsing routine processes the security configuration data to dynamically determine the data-access security parameter values. For example, in response to a read operation the processor 111 may determine the security state of the accessed (read) user data based: on the security level of a partition of the memspace from which the read data is stored; and/or the cryptographic mode of the DSD 100, as represented in the security configuration data of the DSD 100.

Driver 115b defines a set of driver functions that are executable by the processor 111 in order to generate indicator control signals, in response to input indicator control parameters, for control of the DSI 140. In some embodiments, the driver 115b and/or the control data 115c are part of the firmware 115a. The functions provided by the driver 115b are specific to the indication components of the DSI 140 and are referred to collectively as a corresponding driver for the respective component. For example, the driver 115b may include an LED driver, a LCD panel driver, and a bi-stable display driver, or other drivers according to one or more of the various possible configurations of the DSI 140.

The processor 111 is configured to execute the firmware 115a and the driver 115b to generate the indicator control signal in order to cause the DSI 140 to indicate the security parameter value (e.g., access state). Specifically, processor 111 transmits the indicator control signal, as generated by the driver 115b, to the indicator control circuit 141 of the indicator 140. The indicator control circuit 141 is indicator specific, and is configured to interpret the signal generated by the corresponding indicator specific driver 115b to drive the display components 142 to visually represent the parameter value. For example, the indicator control circuit 141 of a DSI 140 including an LED array may include an LED control switch that translates the indicator control signal into individual LED control signals for operating each of the RGB sub-LEDs (as generated by a color driver 115b). In another example, the indicator control circuit 141 of a DSI 140 including an electrochromic material may include a color surface interface for applying commands of the indicator control signal to the color changing surface 142.

Visual Security Indicators

FIGS. 2a, 2b, 3a, and 3b illustrate examples of particular display components 142 that provide a visual indication of values of at least some of the security parameters of DSD 100. In the illustrated embodiments, DSD 100 is an external storage drive in the form of a direct access storage (DAS) device configured to be removably connected to, and easily disconnected from, the host system 130 in an ad-hoc manner. The data port 106 is configured to accept a USB connector for connecting DSD 100 to the host computer 130. The enclosure 116 houses a storage drive 108 in the form of an SSD for storing user data 109. DSD 100 is configured to obtain power through the USB connector in response to a connection to the host system 130 via data port 106. Data is transferred between the connected host 130 and the internal storage drive 108 of the DSD 100 via the data path 104. Input components 102 include button set 103 including at least buttons to control the security functions of the device 100.

Figure 2A:
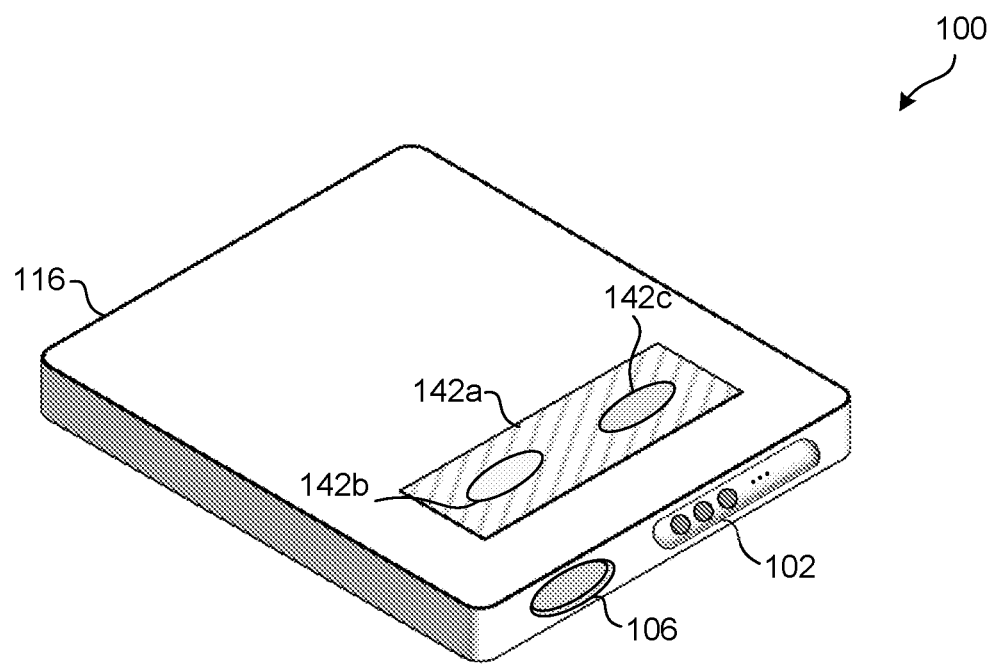
FIG. 2a illustrates a schematic diagram of a DSD with light emitting diode display components, in accordance with some embodiments.
Figure 2B:
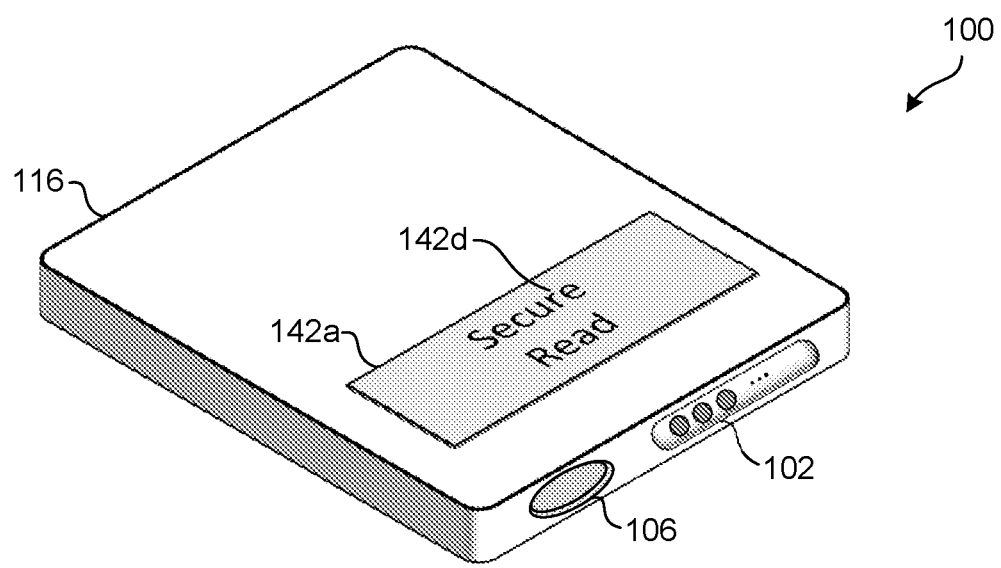
FIG. 2b illustrates a schematic diagram of a DSD with a first panel display component, in accordance with some embodiments.

In some examples, the display components 142 of the DSI 140 include color display components each configured to display a color; and change the displayed color in response to a voltage applied to the color display component to indicate the value of a represented security parameter. As illustrated in FIGS. 2a and 2b, the display components 142 may include a display panel 142a incorporated into, or at least partially integrated with, a top surface of the enclosure 116. The display panel 142a includes corresponding sub-components 142b-c in the form of individual light emitting components 142b, 142c and/or a display image or label 142d formed on the display panel 142a. Display panel 142a is configured to arrange the display sub-components 142b-d in a pre-specified and controlled manner by applying control signals to the one or more sub-components, for example to cause the sub-components to emit a particular color (the "displayed color") at a given intensity.

With reference to FIG. 2a, the light emitting components 142b, 142c are implemented as color changing (RGB) LEDs each including: individual red, green, blue sub-LEDs configured to respectively emit light at red, green and blue wavelengths, and a microcontroller configured to control the intensity of light emitted from each individual RGB sub-LED. Display panel 142a controls each LED 142b, 142c via the application of a control voltage signal with three component values specifying a corresponding voltage to be applied to each sub-LED by the microcontroller, thereby enabling the LED 142b, 142c to display an arbitrary color over the RGB space. The LEDs 142b, 142c of the display panel 142a are independently controlled such as to display indications of security parameter values in the form of distinct colors. Although FIG. 2a depicts a configuration of the display panel 142a including two LED display components 142b, 142c, it will be apparent that in other examples, the LED display panel 142a may include any arbitrary number of sub-LEDs depending on the desired configuration of the DSI 140.

FIG. 2b illustrates an example DSD 100 in which the display panel 142a is a flat-panel display such a LCD, LED, or OLED screen configured to display an arbitrary image, text label, or symbol 142d. For example, display 142a may be implemented as a form of LCD panel, such as an in-plane switching (IPS) panel. IPS panel 142a includes a liquid crystal layer set between a series of polarizing color filters used to generate red, green and blue subpixels. The liquid crystals are oriented in a plane parallel to the glass substrates and an electrical field is applied through opposite electrodes on the same glass substrate, so that the liquid crystals can be reoriented (switched) essentially in the same plane. The color of each pixel in the display 142a is set by two transistors on the application of a control voltage signal.

In some examples, the panel 142a is configured to display a textual label 142d indicating the value of the represented security parameter(s), as depicted in FIG. 2b. Label 142d may be a color, greyscale or two-tone (i.e., black and white) label. In other examples, the panel 142a may be configured to display a graphic or image associated with the value of the represented security parameter. The image or graphic is pre-specified and is determined by a mapping function of the firmware 115a from input of the discrete value of the security parameter(s).

Figure 3A:
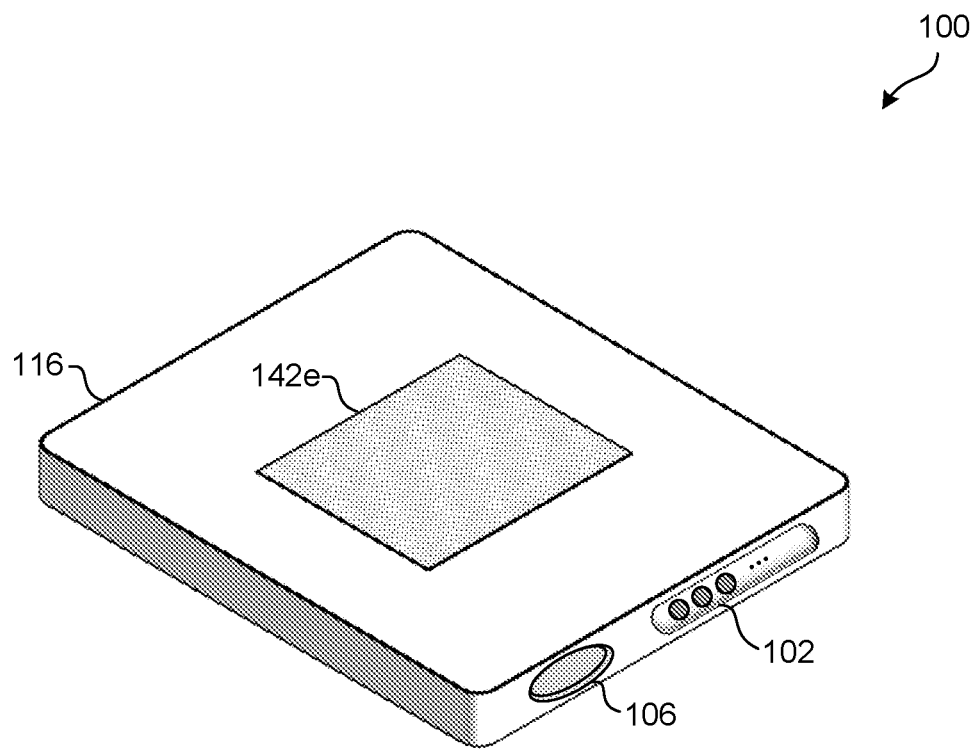
FIG. 3a illustrates a schematic diagram of a DSD with a second panel display component, in accordance with some embodiments.

FIG. 3a illustrates an example DSD 100 in which the display components 142 include a second panel in the form of a color changing surface 142e. Surface 142a is formed from at least one electrochromic material (chromophore), having optical properties (e.g., optical transmission, absorption, reflectance and/or emittance) that are controllable in a continual but reversible manner on application of a voltage to the material. The color change is persistent, and the application of electrical energy is only needed to cause a color change to surface 142e, but not to retain the color.

With reference to FIG. 3a, the surface 142e may be organized as a single electrochromic layer, as multiple continuous layers, or as separate layers in combination with other components (e.g., electrolytics) to form part of an electrochromic device (ED). For ease of notation, references to the surface 142e include the one or more electrochromic materials organized in any of the aforementioned configurations. In some examples, the indicator control circuit 141 may include components configured to apply a voltage to the electronic materials of surface 142e, such that at least part of the circuit 141 and the surface 142e collectively form an ED.

The optical properties of surface 142e are variable in response to the application of a voltage to the electronic materials. The constituent electrochromic material(s), and therefore surface 142e, is configured to change color in response to a voltage applied to the material(s) such as to indicate the value of the represented security parameter of the data storage device 100. This enables surface 142e to maintain a color corresponding to a particular security parameter value of the DSD 100 without the supply of power to the device 100. For example, in a configuration where the surface 142e indicates the value of the access state security parameter, following a transition of the device 100 to the locked state, the electrochromic material may continue indicate the locked state without a voltage being applied to the material.

The color changing surface 142e is formed as an integral portion of the enclosure 116. The dimensions of the surface 142e may vary according to embodiments of the DSD 100. For example, the size of the surface 142a may be limited to a sub-region of a surface of the enclosure 116 as depicted in FIG. 3a. As non color changing materials are typically of a lower cost than electronic materials, the overall costs of the enclosure 116 may be reduced by such a configuration (i.e., where only a portion of the enclosure 116 includes the color changing surface 142e).

In other examples, the enclosure 116 may be wholly or mostly made of the color changing surface 142e. The remaining parts of the enclosure 116 are formed from a normal, non color changing material, such as ordinary polymer, plastic, and/or metal materials. For example, a small device, such as a flash drive, may use a color changing surface 142e for the entire enclosure 116, except for the USB connector, which requires a conductive material such as a metal. In this case, the entire device 100 excluding the connector will change color to indicate a security parameter value of the device 100.

The display components 142, and/or sub-components 142b-e, have associated a set of display properties that determine an ability to indicate the security parameters on the occurrence of the corresponding data access or security control operation. Some of the display properties include: a response time, being the time taken by the component to display a security parameter indication (e.g., a color, image, or label representing the parameter value) as measured from when the indicator control signal is received; a transient (or "fall-off") time, being the minimum time required by the component to maintain a displayed parameter indication; and a persistency, being whether the component can retain the indication in the absence of the energy signal and a power source.

Display components with low response and low transient times, such as LEDs and LCD/IPS panels 142a, are fast response components (e.g., ~2 ms), and are capable of accurately indicating the values of parameters that dynamically change quickly in real-time (e.g., parameters associated with data access operations). Components with higher response times, such as electrochromatic surfaces 142e and bi-stable displays (e.g., 1-4 s), are referred to as slow response components. A "non-persistent" component requires power to retain the displayed indication (e.g., an LED), while a "persistent" component retains an indication (e.g., a selected color rendered on an electrochromatic surface) without power (but may require power to transition between indications).

Figure 3B:
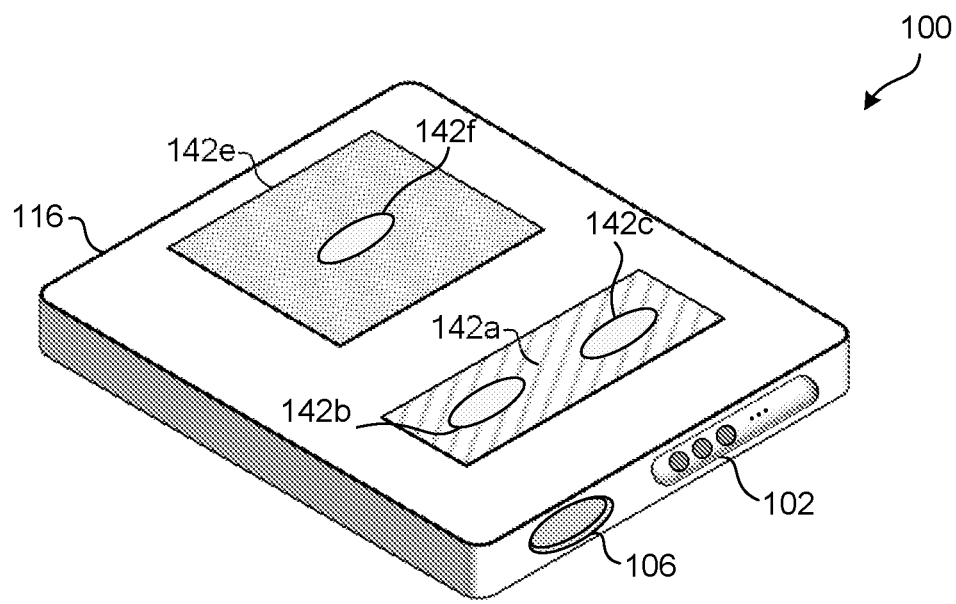
FIG. 3b illustrates a schematic diagram of a DSD with a combination of display components, in accordance with some embodiments.

In some embodiments, the DSI 140 of the DSD 100 is configured to have a plurality of display components 142 with varying display properties. FIG. 3b illustrates an exemplary configuration in which indicator 140 includes a first group of display components 142a-c and a second group of display components 142e-f. The first group of display components is comprised of fast response non-persistent components, including display panel 142a in the form of an LED display with individual RGB color LEDs 142b, 142c. The second group of display components is comprised of both a slow response persistent component in the form of electrochromic surface 142e, and a fast response non-persistent component in the form of RGB LED 142f.

The security indication functionality of the DSD 100 enables the dynamic use of respective groups of display components to visually represent particular security parameter information to the user 101. The memory 114 stores security configuration data including a display component mapping that assigns the at least one security parameter to a corresponding display component. The controller 110 then invokes the corresponding display component, via the indicator control circuit 141, to visually represent the values of the particular security parameter using the assigned component. For example, first display component group 142a-c may be assigned to indicate the data-access security parameters, including the security state of the user data associated with a data access operation (e.g., by LED 142b), and/or the type of the data access operation (e.g., by LEDs 142c). Second display component group 142e-f may be assigned to indicate device-level security parameters, including for example the access state and the state of the communication channel between DSD 100 and DSA 133.

By default, the controller 110 is configured to assign fast response non-persistent components to indicate data access parameters due to the transient nature of the operation and the corresponding security information. Slow response persistent components are assigned to indicate security information with a comparatively longer relevance, such as device-level security conditions or the activation state of one or more security functions. This is advantageous in that it provides a capability to customize the security parameters that are visually represented by particular display components. For example, the controller 110 may be configured to enable the display of value of the data security type by a LED rather than a color-changing surface, since the fast response time of the LED is better suited to provide the security information as it is relevant in real-time.

In some embodiments, the assignment of security parameters to display components 142 of DSI 140 is user-configurable via a security control operation performed on the DSD 100 by an external device 132. The controller 110 may be configured to restrict the assignment of security parameters to particular display components based on the parameter type (i.e., data-access or device-level) and the response characteristic of the component.

Alternatively, or in addition, the controller 110 may be configured to set varying display characteristics for indicating security information generated in association with the occurrence of a data access operation and a security control operation. For example, one or more LED display components may be assigned to indicate values of pre-specified data access and/or device-level security parameters. The controller 110 may set the indication duration of a parameter value displayed by the respective LEDs differently for each parameter type. Data access parameter values, such as an indication of a "secure" user data state, or a "read" operation type, may be indicated with a short duration burst or flash of the LED, reflecting the short amount of real-time taken to perform the operation. By contrast, device-level parameter values, such as the access state, may be indicated with the LED displaying an indication color indefinitely until the state is changed. In some configurations, the controller 110 determines the indication duration of a security parameter based on the display properties of the assigned display component.

Data Access Security Indications

Figure 4:
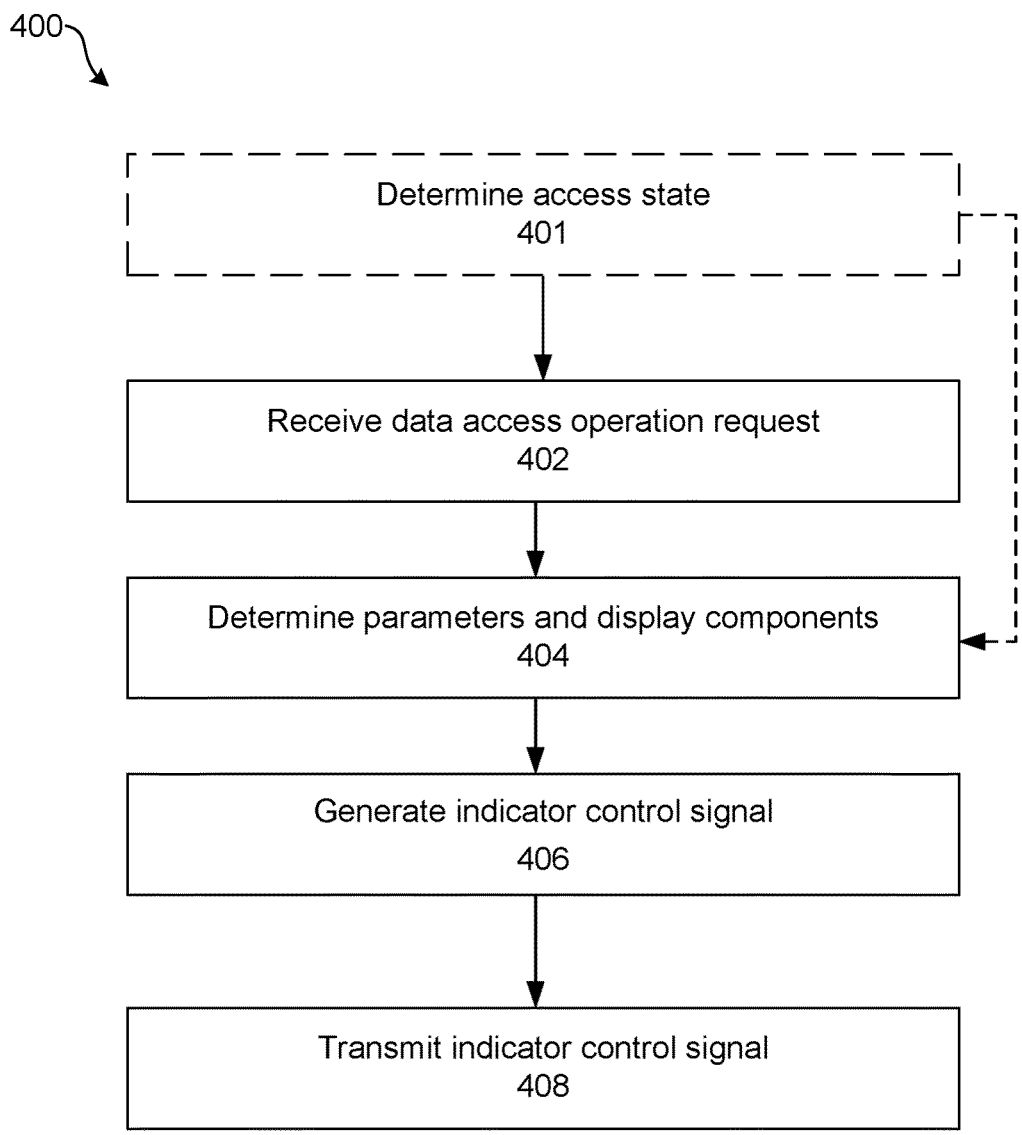
FIG. 4 illustrates a flow diagram of a process for indicating a security parameter in response to a data access operation requested on the DSD, in accordance with some embodiments.

FIG. 4 illustrates a method 400 for indicating one or more security parameters associated with a data access operation performed on the DSD 100 by host 130 according to the described embodiments. The steps of the process 400 are implemented at least in part by the DSD 100 or its components, such as the controller 110. At step 402, the controller 110 receives a request for a data access operation from the host computer system 130 to access user data 109 of the storage medium 108. For example, the data access operation may be a read operation to retrieve data 109 from the medium 108, or a write operation to store user data provided in the request to the medium 108.

At step 404, the controller 110 processes the data access operation request to determine the i) data-access security parameters for which values are to be indicated to the user (i.e., which security information is to be indicated), and ii) the corresponding display components that are configured to perform the indication (i.e., how the indication will proceed relative to the display components of the DSI 140).

The controller 110 identifies the type of the request on receipt from the host 130 as associated with a data access operation and retrieves parameter indexes identifying the data access security parameters for which values are to be indicated to the user. In the described examples, the security configuration data includes a display component mapping data $DC_{Map}$ assigning security parameters to a corresponding display component, such as to flag to the controller 110 that the corresponding display component visually represents the parameter according to the current security configuration of the DSD 100. The mapping $DC_{Map}$ is stored in memory 114 as an array, list, or other suitable data structure. In one example DSD 100 as depicted in FIG. 3b, the mapping $DC_{Map}$ includes the following entries:

| Parameter type | Parameter index | Parameter description | Display component identifier [FIG. 3b reference] |
|---|---|---|---|
| Data-access | 0 | Security state (user data) | LED-0 [142b] |
| | 1 | Type of access operation | LED-1 [142c] |
| Device-level | 2 | Access state | Panel-1 [142e] |
| | 3 | Partition security | Null |

-continued

| Parameter type | Parameter index | Parameter description | Display component identifier [FIG. 3b reference] |
|---|---|---|---|
| | 4 | level(s) Channel connection state (DSA) | LED-2 [142f] |
| | 5 | Remote security function state (DSA) | Panel-0 [142a] |

The controller 110 indexes the retrieved component mapping data $DC_{Map}$ to obtain a set of display component identifiers for each of the data-access parameters defined by the configuration. For example, in this case the controller 110 retrieves the identifiers "LED-0" and "LED-1" of LED display components 142b and 142c of panel 142a, which correspond to the user data security state and access operation type parameters (i.e., with parameter indexes 0 and 1). The controller 110 does not need to retrieve the component identifiers for any of the device-level parameters (indexes 2 to 5) since the operation request received (in step 402) is not a device-level security control related operation. In the example configuration depicted the partition security level parameter is not assigned to any display component in mapping data $DC_{Map}$ and as such the values of this parameter will not be indicated by the DSI 140.

The controller 110 generates an indicator control signal to cause the data DSI 140 to indicate the values of the data-access parameters, and transmits the generated indicator control signal to the indicator 140, at steps 406 and 408 respectively. The controller 110 is configured to generate the indicator control signal according to the display components 142 identified at step 404 and the corresponding indicator control circuitry 141.

Figure 5:
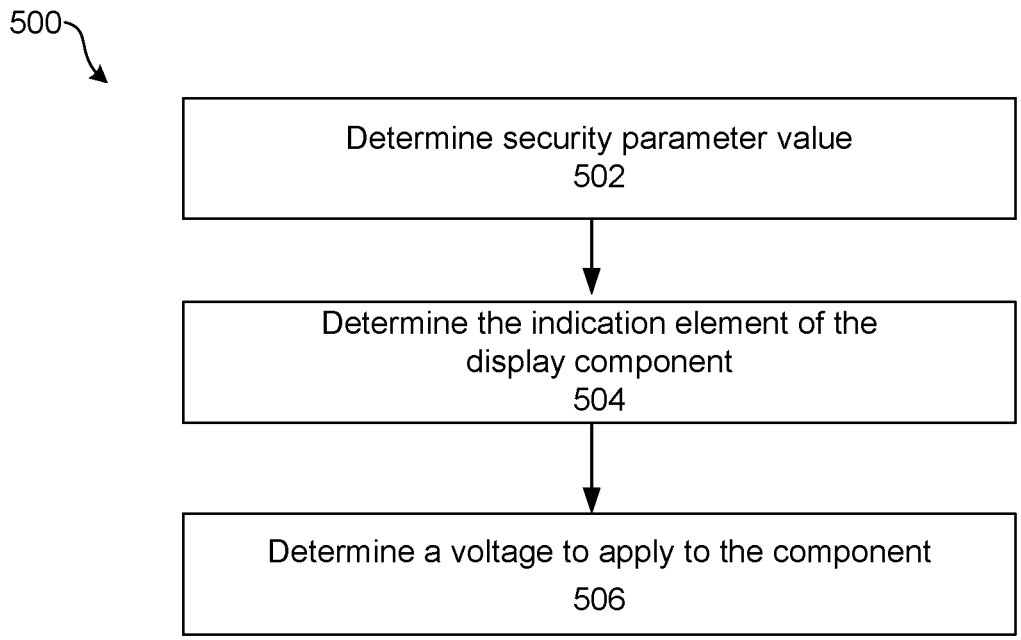
FIG. 5 illustrates a flow diagram of the generation of an indicator control signal for a color changing display component, in accordance with some embodiments.

In the described examples, an indicator control signal is generated for each of the display components identified at step 404. FIG. 5 illustrates a process 500 to generate an indicator control signal in response to the data access operation for a single identified component. At step 502, the controller 110 determines the values of the security parameter to be indicated by the component in response to the data access operation. Processor 111 obtains the parameter value dynamically in accordance with the received data access request by executing a routine stored in the firmware 115a to parse the request. In the described examples, the parameter values associated with the data access operation are in the form of binary state variables, such as for example '0' or '1' to represent non-secure and secure states of the user data (parameter 0), and to represent a "read" and "write" type operation (parameter 1), respectively.

At step 504, the controller 110 determines an indication element for display by the identified display component to represent the corresponding security parameter. The indication element is determined based on a mapping of, at least, the set of possible security parameter values to associated discrete values of corresponding elements of the display component. For security parameters having discrete values, such as a binary, Boolean, or integer type, the set of values are mapped directly to the corresponding element values.

In some embodiments, the controller 110 is configured to translate a plurality of determined security parameter values (e.g., from a series of data access operations performed over a time interval) into a single display component indication. This enables the controller 110 to represent the security parameter information as an aggregation or collection of data access operations performed on the DSD 100. In some examples, the controller 110 implements the translation by applying one or more mathematical functions to the set of parameter values, such as to obtain an average or median parameter value. The average or median value is then mapped to a corresponding display element indication, for example using histogram binning or another similar technique.

In the described embodiments, the controller 110 is configured to maintain a component specific mapping of particular indication elements (e.g., colors, labels, etc.) to each possible discretized security parameter value. This mapping may be stored in the firmware 115a or as part of the indicator control data 115c.

For the example above and as depicted in FIG. 3b, the controller 110 is configured to generate an indicator control signal for LED-0 component 142b. As determined from the $DC_{Map}$ data, LED-0 represents the value of the security state parameter. Consider the data access request received at step 402 to be for a read operation to secure (i.e., encrypted) user data. In one exemplary configuration, the indicator control data 115c specifies a RGB color model representation of each possible color displayable by the LED-0 component to represent security state parameter information (i.e., as indication color data) as follows:

| Security state of user data | Parameter value | Indication element (color) | Indication data (RGB color vector) |
| --- | --- | --- | --- |
| Non-secure | 0 | Yellow | (0, 255, 255) |
| Secure | 1 | Green | (0, 255, 0) |

In this example, the non-secure and secure states are represented by yellow and green colors respectively, and indicator control data 115c maps a binary security state value to a corresponding RGB color vector. In other embodiments, the security state parameter may be assigned to another color display component, and the indicator control data 115c may include other indicator color data representing the values of other optical properties of the assigned component (e.g., transparency values of electrochromic material 142e).

At step 506, the controller 110 determines a voltage to apply to the display component to change the displayed element to the indication element. Processor 111 determines the voltage value by retrieving a subset of the indicator control data 115c corresponding to the security parameter value and by executing a routine of firmware 115a with the retrieved data. The indicator control data and routine are specific to the display component. In the above example, the controller 110 determines voltage values for indicating the security state by invoking the firmware routine with the green color vector (0,255,0) (the indicator value denoting secure state) and the parameter index 0 (the display component value denoting LED-0). The firmware routine returns one or more voltage values to apply to the LED 142b to cause a change in the displayed color to the indicator color.

The processor 111 is configured to generate the indicator control signal by invoking driver 115b with the determined voltage values, and other data relevant to the control of the display component (e.g., LED-0) as stored in firmware 115a. Driver 115b is specific to the display component. For the above example, driver 115b generates an indicator control signal to direct the function of the LED component 142b from the input voltages determined by the firmware routine.

Returning to FIG. 4, at step 408 the controller 110 transmits the indicator control signal to the control circuit 141 of DSI 140. The function and configuration of the indicator control circuit 141 varies according to the display components 142 of the DSI 140. In the described examples, the indicator control circuit includes one or more electronic components that are configured to process the received indicator control signal to: apply the determined voltage(s) to the display component; and cease application of the voltage to the display component after the display of the indication element.

For example, with reference to the secure read data access operation described above, the control circuit 141 directs the operation of the LED 142b to indicate the secure security state by applying the determined voltages of the control signal to cause the LED to emit light of a particular color (e.g., green indicating the secure state). The control circuit 141 ceases the application of the determined voltage to the LED after the color change. In some example configurations, on cessation of the application of the determined voltage to the LED 142b, the indicator control circuit 141 causes the LED 142b to assume an off state in which no color is displayed.

In other implementations, on cessation of the application of the determined voltage to the LED 142b, the indicator control circuit 141 is configured to apply a pre-specified voltage to cause the LED 142b to change the displayed color to an auxiliary color. The auxiliary color is defined by the indicator control data 115c (e.g., white), and is selected such that it not does correspond to any color utilized to represent any value of the set of possible security parameter values indicated by the component (e.g., LED 142b). In this implementation, the LED 142b is in an "active" or "on" state whenever powered, irrespective of whether there is a corresponding data access operation performed on the DSD 100 by the host 130. This is advantageous, for example, in providing the user 101 with an indication of whether the device 100 is powered without requiring the use of a separate indicator component.

In the example described above, the DSI 140 provides an indication of data-access security parameter information to the user 101 via LED display components 142b and 142c. In other examples, different display components may be assigned to indicate the data-access security parameter values, including other fast response components such as a LCD, IPS or similar screen, implemented for example as panel 142a. In such implementations, the generation of the indicator control signals involves the determination of an appropriate indicator element (e.g., an image, text label, and/or graphical icon) for display on the panel 142a to represent the value of the security parameter, and the determination of voltages to apply to the panel 142a to change the displayed element to the indication element. The controller 110 maps the parameter value to the display component (or sub-component), and subsequently to a set of voltages for driving the display functionality of the component via the indicator control signal through control data 115c and firmware routines 115a in the same manner as described in the examples above.

FIG. 2b illustrates a configuration in which the display components 142 comprise a display panel 142a configured to display an electronic label 142d on a substrate of the panel 142a in response to a voltage applied to one or more regions of the substrate, where the label indicates the value of the represented security parameter. For example, the display panel 142a may be a LCD display, such as an active-matrix display including one or more substrates with oxide film electrodes, and a backlight located at the back of the substrate stack and implemented, for example, as a RGB-LED, monochrome LED or WLED array.

In relation to the example described above, where a secure read data access operation is performed on the DSD 100, label 142*d* is comprised of an indicator element in the form of text describing the indicated parameter (e.g., the security state). The text is determined based on a mapping of, at least, the non-secure state to a first label (i.e., the static text label "Non-Secure") and the secure state to a second label (i.e., the static text label "Secure"). The mapping is component and parameter specific. For example, the indicator control data 115*c* may include, for each voltage controllable region of the panel (i.e., each pixel), a 2-dimensional co-ordinate vector (x,y) indicating the relative position of the pixel on the panel 142*a*. The controller 110 is configured to maintain, for each label, data specifying the value of particular pixel locations on the panel as "light" or "dark" (e.g., as binary '0' or '1' values) in order to render the label on a substrate of the panel 142*a*. In one configuration the indicator control data 115*c* stores the mappings as a matrix structure.

The use of an LCD or similar display panel 142*a* enables the DSI 140 to display indications for multiple security parameters on the single panel component (i.e., without the need to implement and control multiple individual components separately to visually represent security parameters). For example, FIG. 2*b* illustrates the use of indicator element (i.e., display label 142*d*) as the concatenation of individual display elements associated with indicating the value of the security state and access operation type parameters into a single indicator label. The single indicator label 142*d* has values indicating the combined state of the data-access security parameters in the described implementation, the possible states being: SECURE READ; SECURE WRITE; NON-SECURE READ; and NON-SECURE WRITE.

In some examples, the indicator control circuit 141 is configured to control the operation of a display component 142 of the DSI 140 to indicate the represented security parameter for a pre-specified indication duration. For example, the indication duration prescribes the length of the time period over which the visual, auditory, or other representation of the security parameter persists. Specifically, the controller 110 may set the indication duration to a pre-specified value, such as to exercise control over the user experience associated with the provision of the security indications. For example, a read type data access operation may be completed in the order of 100 micro-seconds, and a visual indication (e.g., a flash of an LED) that only persists over this period of time will likely be unperceivable to the user 101.

To address the above issue, the controller 110 may be configured to implement an indication duration of a pre-specified length such as for example 500 ms. The indicator control circuit 141 is correspondingly configured to cease applying the voltages of the generated indicator control signal only after the lapsing of the indication duration, calculated as commencing on the change of the displayed element (e.g. color) to the indication element.

The value of the indication duration is stored in the indicator control data 115*c* of the controller memory 114. The indication duration may be implemented as a global variable used uniformly by each display component 142*a-f*. Alternatively, component specific durations may be stored in the indicator control data 115*c* thereby permitting the controller 110 to individually control the transient response of the displayed visual indication of each component. For example, the controller 110 may determine a minimum value for the indication duration t as $t=t_{res}+t_{lead}$ where $t_{res}$ is the response time and $t_{lead}$ is a lead time being the duration for which the fully represented parameter value remains displayed by the component 142*a-f*. In some examples, a single display component, such as an LED 142*f*, is assigned to provide indications for multiple security parameters (i.e., via the DC map data structure).

In such examples, or as otherwise desired, the controller 110 set the indication duration of a data access operation to be shorter than the indication duration of a security control operation. This is advantageous in permitting the DSD 100 to prevent security information associated with control operations, which may only occur sporadically and/or unpredictably, from being starved of display time in the presence of a large number of data access requests. This is particularly significant in the case of a single display component configured for mutually exclusive display of data access and device-level information.

In some examples, the controller 110 processes one or more device-level security control parameters, as specified by the security configuration data, prior to indicating one or more data-access security parameters. With reference to FIG. 4, at step 401 access to user data is physically enabled at the device-level as a condition for the controller to receive a data access operation from the host 130. In response to a transition to the locked access state, the controller 110 may be configured to display a corresponding indication on one of more of the display components that are assigned to represent data-access security parameter information.

For example, the controller 110 may be configured to determine an indication component that is presently assigned to indicate a data-access parameter (e.g., LED-0 (142*b*)) on which to indicate the locked state of the device 100 (e.g., by emitting a red color). The controller 110 may be configured to generate the indications persistently, periodically, or otherwise in response to the detection of an attempt by the host 130 to perform a data access operation on the DSD 100 (e.g., by monitoring of the data port 106).

Control Operation Security Indications

Figure 6:
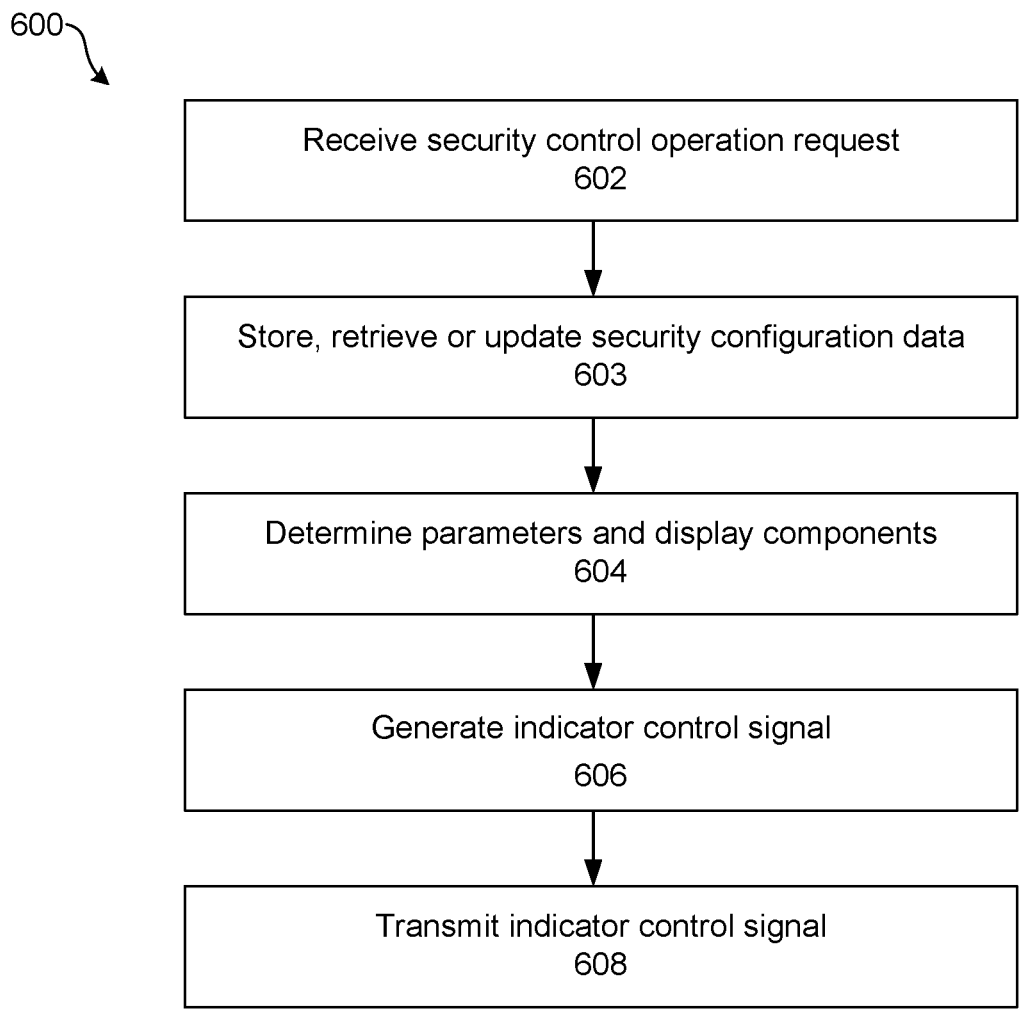
FIG. 6 illustrates a flow diagram of a process for indicating a security parameter in response to a security configuration data update performed on the DSD, in accordance with some embodiments.

FIG. 6 illustrates a method 600 for indicating one or more security parameters associated with a security control operation performed on the DSD 100 by the external device 132. The steps of the process 600 are implemented at least in part by the DSD 100 or its components, such as the controller 110. At step 602, the controller 110 receives a request for a security control operation transmitted via the device security application 133, as executing, at least partially, on a processor of the external device 132.

Controller 110 is configured to process the received security control operation request to: (i) store, retrieve or update the appropriate security configuration data (e.g., update the access state to "locked"); and (ii) perform any associated security function specified by the security control operation (e.g., issue a control signal to disable data transfer between the host 130 and the medium 108 via the data path 104).

At step 603, the controller 110 processes the security control operation request to store, retrieve or update the security configuration data of the DSD 100. The particular values of the security configuration data that are set, adjusted or retrieved in response to the operation are dependent on the corresponding security control function executed by the DSA 133. Various security control functions provided by the DSA 133 may alter security data configuration values of the DSD 100 including any one or more of, but not limited to:

the access state (e.g., representing whether the DSD is locked or unlocked at the device level);

encryption or encoding keys used by cryptography engine 107 to logically protect user data stored to the medium 108;

communication protocol attributes (i.e., to control the formation and operation of the communications channel between the external device 132 and the DSD 100);

identifiers, memory addresses, and/or security levels of one or more partitions of the medium 108;

device identity values, such as a device identification key (DK), a user identifier of a user of the device 100, a location identifier representing a location of the device 100, and datetime values representing timestamps of one or more events performed on or with the device 100 (e.g., the time of the last backup of the contents of medium 108);

display configuration data values, such as display component map $DC_{Map}$ and/or specific values determining the operation of one or more display components (e.g., display panel backlight brightness level); and an activation state of one or more security functions of the DSA 133 as associated with the DSD 100 (e.g., representing whether a location tracker function is enabled or disabled for the device).

The user 101 interacts with the DSA 133 executing on the external device 132. The user 101 may specify a desired value of one or more device-level security parameters, including the access state, via an API function call resulting from manipulation of elements of the graphical user interface (GUI) of the DSA 133 (as rendered on device 132). For example, to set the access state of the DSD 100 the DSA 133 executes a setPhysicalAccess(s) operation, in response to input received from the user 101 via the GUI, with the s variable value representing the desired locked or unlocked PA state of the DSD 100. The DSA 133 transmits the operation request generated by the function call to the DSD 100 via the communication channel established between the DSD 100 and the device 132. Transmission of the security operation request data to the DSD 100 occurs in the form of a message with a format that is determined by the channel communication protocol (e.g., Bluetooth-JW).

The security configuration data values stored, retrieved or updated by a security control operation may include values for some, all or none of the device-level security parameters, in addition to values for other configuration data that do not directly indicate security information to the user (e.g., encryption or encoding keys of the cryptography module 107).

At step 604, the controller 110 processes the security control operation request to determine the i) device-level security parameters for which values are to be indicated to the user, and ii) the corresponding indicator display components to perform the indication. As described above, the device-level parameters with values to be indicated are specified by parameter indexes stored in the memory 114 of controller 110.

The particular device-level parameter values that are indicated to the user in response to the security control operation may be independent of the effect of the control operation to cause any storing, retrieving or updating of the security configuration data (i.e., irrespective of whether the values of the particular device-level parameters are themselves altered or retrieved by the operation). In other embodiments, a change in a particular device-level parameter, or the retrieval of the value of the parameter, may trigger the controller 110 to indicate the present (or updated) value of the security parameter.

The processor 111 retrieves the display component mapping data $DC_{Map}$ to determine the display component of DSI 140 assigned to indicate the value of the determined device-level security parameter(s) for the received control operation. For example, with reference to FIG. 3b the indicated device-level parameters may include the access state, via panel 142e, and the channel connection state, via LED component 142f.

The controller 110 generates an indicator control signal to cause the data DSI 140 to indicate the values of the device-level parameters, and transmits the generated indicator control signal to the indicator 140, at steps 606 and 608 respectively. As described above for the data-access parameter indications, an indicator control signal is generated for each of the display components identified at step 604. Referring back to indicator control signal generation process 500 of FIG. 5, at step 502 the controller 110 determines the security parameter values to be indicated. As the security parameters are device-level parameters, processor 111 obtains the values by reading the corresponding security configuration data from memory 114.

For example, processor 111 obtains the access state by accessing memory 114 to retrieve the value of the binary access state variable. This value corresponds to the access state presently maintained by the DSD 100, as selectively set by the controller 100 such as in response to a lock/unlock security function call executed by the DSA 133. At step 504, the controller 110 determines an indication element for display by the identified display component to represent the corresponding security parameter. In the described example, the access state is indicated by a surface 142e having an electrochromic material configured change the indication element (e.g., the color of the surface) in response to a voltage applied to the material.

Electrochromic surface 142e is a slow response display component and is therefore suited to indicating the access state, since the physical state of the device (e.g., locked or unlocked) is not expected to change extremely frequently in time (unlike, for example, a read/write operation state). The controller 110 determines an access color corresponding to the determined access state to indicate on the surface 142e. For example, the access color may be determined based on a mapping stored in the indicator control data 115c of, at least, the unlocked state to a first color and the locked state to a second color to indicate the present value of the access state. In other examples, the indicator control data 115c may specify other optical properties of the surface 142e such as transparency values of the electrochromic material, such that surface 142e assumes the appropriate access color in response to a change in transparency.

At step 506, the controller 110 determines a voltage to apply to the surface 142e to change the displayed element to the indication element (i.e., the access color). Processor 111 determines the voltage value by retrieving a subset of the indicator control data 115c corresponding to the access state value and by executing a routine of firmware 115a with the retrieved data, as described above. The processor 111 is configured to generate the indicator control signal by invoking driver 115b with the determined voltage values, and other data relevant to the control of the optical properties of surface 142e as stored in firmware 115a. Driver 115b is specific to the color changing surface 142e and generates an appropriate indicator control signal to direct the function of the control circuit 141, and thereby control the color changing surface 142e.

Returning to FIG. 6, at step 608 the controller 110 transmits the indicator control signal to the control circuit 141 of DSI 140. For example, with reference to a security control operation that causes the access state to be indicated, the control circuit 141 directs the operation of the surface 142e to indicate the access state by applying the determined voltages of the control signal to cause the surface 142e to change to a particular color (e.g., blue indicating the device is "unlocked" and able to be used as a storage drive). The control circuit 114 ceases application of the voltage to the electrochromic material of surface 142e after change of the color of the surface to the indication color. In some embodiments, the electrochromic material of the surface 142e is configured to retain the indication color after cessation of the application of the voltage. This is advantageous in that it enables the DSD 100 to indicate the value of the device-level security parameter in the absence of a power source.

In other embodiments, other persistent components may be implemented in place of, or in addition to, electrochromic surface 142e, such as one or more bi-stable displays. A bi-stable display may be configured to display indication elements in the form of labels, similar to the images depicted as displayed by LCD panel 142a in FIG. 2b. For example, a DSD 100 may have a single bi-stable display panel (not shown), similar to the panel 142a shown in FIG. 2a, assigned to indicate the access state. The indicator control data 115c may store: a mapping of the unlocked state to a first label (i.e., a static text label "Unlocked") and the locked state to a second label (i.e., a static text label "Locked"); and a mapping representing whether particular pixel locations on the substrate of the bi-stable display panel are "light" or "dark" (e.g., as binary '0' or '1' values) in order to imprint the label on the bi-stable display panel. A firmware 115a routine outputs a set of voltage values to apply to the respective pixel regions of bi-stable display panel in order to change the imprinted label, and the indicator control circuit 141 is configured to apply the voltages to cause a change of the label, and to cease application of the voltages after the change of the label.

Some device-level security parameters have values that vary rapidly in real-time, such as the connection state of the secure wireless communication channel between DSD 100 and external device 132. For example, the controller 110 may be configured to indicate an "ACTIVE" state of the channel in response to any data transfer through the channel. In this configuration, the assignment of LED 142f to the connection state parameter indicates, in real-time, instances of an activity in the connection between the DSD 100 and the external device 132 (e.g., in response to any security control operation, or other operation, which causes data to flow between the DSD 100 and the external device 132).

It will be appreciated that FIG. 3b illustrates just one exemplary embodiment of the DSD 100 including a combination of fast response display components (e.g., LEDs 142b, 142c, 142f and display panel 142a), and slow response components (e.g., electrochromic surface 142e). Any arbitrary assignment of one or more display components to one or more security parameters is possible by specifying the values of the security configuration data, such as for example irrespective of whether the display components have a fast or slow response, and/or are persistent or non-persistent, and whether the corresponding parameters are data-access parameters or device-level parameters. Although not mandatory, assignments of display components with particular characteristics (such as a level of response time and/or persistency) to types of security parameters (e.g., of the device-level or data-access type) may promote one or more of the technical advantages described above.

Security Control Platform

Figure 7:
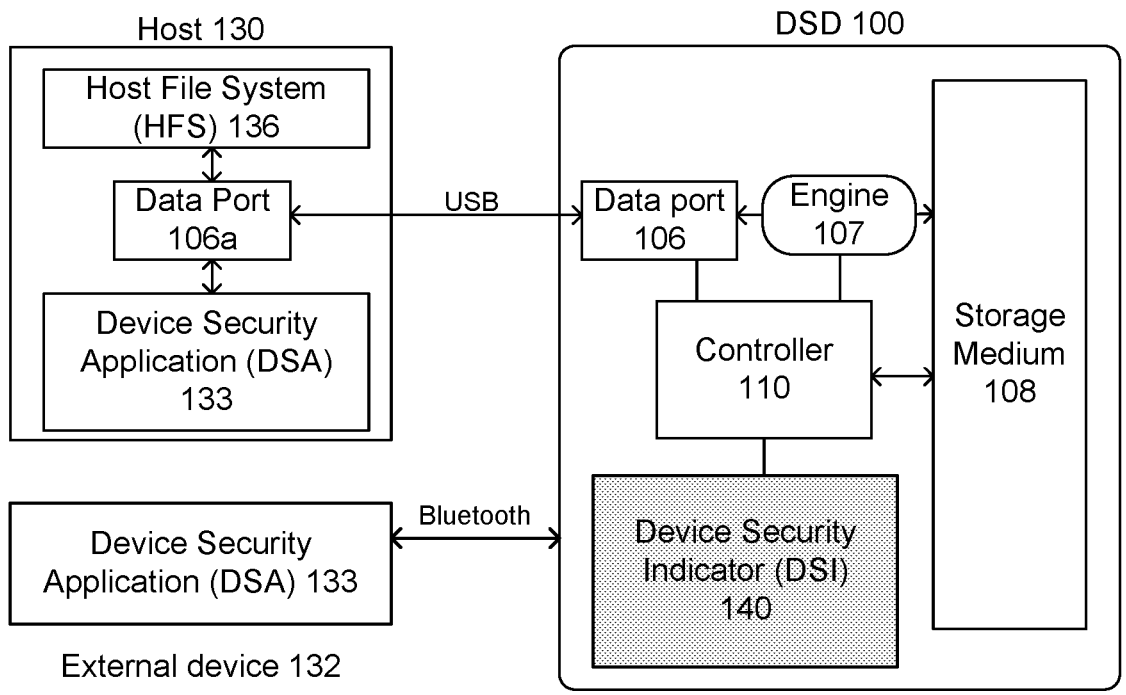
FIG. 7 illustrates a schematic diagram of an exemplary security control platform, in accordance with some embodiments.

Aspects of the security indication functionality of the DSD 100 may be described in the context of an exemplary security control platform as illustrated in FIG. 7. The security control platform 700 comprises: DSD 100; a host computer system 130 connected to the DSD 100 via data port 106; and an external device 132 connected to the DSD 100 via a communications channel, such as a wireless connection over Bluetooth or a similar protocol.

Each of the host 130 and the external device 132 are computing devices configured to execute an instance of the DSA 133. In some examples, the external device 132 is a mobile computing device, such as a smart phone or tablet. The mobile device 132 includes at least one processor configured to perform the execution of sequences of machine instructions, and may have architectures consisting of a single or multiple processing cores such as, for example, a system having a 32- or 64-bit Advanced RISC Machine (ARM) architecture (e.g., ARMvx). In other embodiments, the external device 132 may be a device of a computer system environment, such as a server or workstation device, including for example a host computing system similarly or identically configured to host 130.

Host 130 maintains a host file system (HFS) 136 including a set of computer routines, programs, data, and methods controlling the storage and retrieval of host data from a corresponding local or remote host storage drive. The instance of the DSA 133 executing on the host 130 may reside partly in the HFS 136, including, for example, user or configuration data, and/or application data of the DSA 133.

The configuration of an exemplary DSA 133, such as the Western Digital ArmorLock application, is described herein below in relation to the security indication functionality of the corresponding DSD 100.

In the described example, the DSA 133 is a mobile application in the form of a dedicated software program obtainable from a digital distribution platform that provides applications for an operating system executing on the device (e.g. Google Play Store or Apple Store). In other example configurations, the DSA 133 may be a generic software application, such as a web browser configured to render one or more webpages hosted by a dedicated web server (e.g., as provided by the manufacturer of the DSD 100).

In some embodiments, the enclosure 116 of the DSD 100 has affixed a DSA label 105 such as a QR code that, when read by a QR code scanner, opens a website on a browser application of the mobile device 132. User 101 scans the QR code DSA label 105 to obtain the software application, and to subsequently execute the instance of the DSA 133 on the device 132. DSA 133 executes as a local application program including data instructions and results produced or used by the application 133, as residing in multiple parts of a memory system of the mobile device 132, including, for example, the registers or cache or the processor, main memory, and high volume storage, or in a removable memory.

In some embodiments, the application 133 executes as a "sandboxed" application on the external device 132 in which the privileges of the application 133 are limited to one or more authorized users. Program data of the DSA 133 maintains an entitlement list that enumerates the set of system resources that the application 133 requires to perform the security functions. In other embodiments, the DSA 133 interfaces with the operating system and/or other program data, such as for example via a kernel-level driver.

Connection between the DSD 100 and the DSA 133 may be performed via a Bluetooth connection involving a pairing process to create a shared secret between the two devices for example via Secure Simple Pairing (SSP). In some embodiments, pairing is achieved based on a user interaction with the devices (i.e., via NC, OOB, or PE Bluetooth modes).

In other embodiments, a connection is established via a custom protocol. For example, a Transport Layer protocol may be used that incorporates a multi-step handshake that provides guarantees similar to the Transport Layer Security (TLS) protocol used for HTTPS connections on the Internet. The connection and subsequent exchange of security control data between the DSA 133 and DSD 100 may be secured by a unique hardware identity key (e.g., the IDK of the DSD 100) and a digital certificate identifies the DSD 100 as associated with the DSA 133 using a chain of signatures. The certificate may be cryptographically linked to the DSA label, which is validated by the client applications 133 when connecting to the DSD 100. In some embodiments, the unique key is obtained by the application 133 by scanning the QR code label on DSD 100 as part of a verification or authorization step during the connection establishment process.

Related device-level security parameters include a 'connection mode' value indicating the specific protocol of the connection between DSA 133 and DSD 100 (e.g., the type of Bluetooth mode, or custom Bluetooth mode), and the connection state value indicating activity on the communication channel, as described above. Connection of the DSD 100 to the DAS 133 is performed as a "point and pair" connection process, irrespective of whether the connection occurs over a wireless mode or via USB.

To connect the DSD 100 to the DSA 133 over a wireless Bluetooth connection, the user 101 scans the QR code label of the device 100 (e.g., as printed on the enclosure 116) with a QR scanner application of the mobile device 132 enabling the DSA 133 to connect to the device 100 using the key embedded in the code. To connect the DSD 100 to the DSA 133 over USB, a separate, shorter code is used (e.g., an eight digit PIN), which may be printed next to the QR code on the housing 116.

In some embodiments, the DSA 133 is configured to maintain a certificate generated on connection to the DSD 100, such as by encoding a unique identifier of the drive. To connect to the DSD 100 after first establishing a connection, the DSA 133 presents the stored certificate to the DSD 100. The controller 110 validates the certificate and determines whether the device 132 is authorized to connect. In some embodiments, the re-connection of an already known device 132 to the DSD 100 is indicated distinctly from the connection of a new device (i.e., by the use of different device-level security parameters, and differentiating indication components and/or elements, such as an LED configured to flash a different color for either case).

In some embodiments, DSA 133 is configured to facilitate storage and retrieval of data from the DSD 100 when the device mode is set to restricted (i.e., where user data 109 is logically protected). An authorization process is performed to verify that the user 101 has authorization to access the data 109 of the DSD 100. In some embodiments, the verification involves binding the authorization to the encryption key used to access data on the drive. One or more device-level security parameters may be implemented to indicate success or failure of the verification (i.e., an LED component configured to flash a distinct color for each respective condition).

In some embodiments, the DSD 100 implements a cryptographic key management system including the use of a root private key of the device 100. The root private key may be managed, at least partially, by instances of the DSA 133 for example to provide the key to the DSD 100 dynamically, where the key is secured offline (i.e., to defend against key theft attacks). For example, the private key may be generated in an offline environment using entropy input from multiple sources. In some embodiments, the key may be stored in a the device, such as in a FIPS 140-2 validated hardware security module (HSM). User data may be encrypted according to the modes described herein, for example using 256-bit Advanced Encryption Standard (AES) hardware-based encryption keys utilizing the XTS block cipher mode.

Various device-level security parameters may be implemented in order to indicate the respective data protection functions of the DSA 133 as associated with the managed DSD 100. For example, the security configuration data may specify display components and corresponding indication elements to show: transfers of key(s) between the DSA 133 and DSD 100; the present encryption mode of the device 100 (i.e., "restricted" or "unrestricted") as represented by the data cryptography variable; a strength of encryption being used by DSD 100 in embodiments where multiple cryptographic functions are defined by the cryptography engine 107 (e.g., as determined based on the key length); and whether "on-the-fly" based encryption/decryption is currently active.

In some embodiments, the DSA 133 provides one or more security functions related to controlling, monitoring or otherwise influencing the use of the DSD 100. For example, the DSA 133 provides an interface for detecting or monitoring the last known location of the DSD 100. DSA 133 send a location request control operation to the DSD 100 requesting the value of location data maintained in the security configuration data of the device 100. In response to providing the location data, the DSD 100 may be configured to record a datetime value or similar as a "last location update time" device-level parameter. The datetime value may be indicated to the user 101 via a display component, such as an LCD panel 142a.

In some embodiments, the DAS 133 provides a data protection function configured to generate record data representing the utilization of the storage medium 108 of the device 100. In some implementations, the data protection function records an image of the user data stored on medium 108 backup the data. The recorded image data may represent a full, incremental or differential backup of the one or more partitions of the user data.

In some implementations, the data protection function is a snapshotting function configured to record a complete state of the DSD 100, including a representation of the user data, and security configuration and/or other control data of the device 100. Snapshotting enables the user 101 to capture or "freeze" the state of the device 100 at the current time by initiating the snapshot. The user 101 may then apply one or more modifications to the currently stored user data, and/or adjust the security configuration of the device 100 (e.g., hide or encrypt the data) in preparation for some other use of the device (e.g., for loan of the device 100 to other party). The user 101 may then restore the snapshot, causing the DSA 133 to revert the state of the device 100 back to the state at initiation (i.e., to its "frozen state") including restoring the user data and the security settings.

Device-level parameters may be defined to indicate security information to the user 101 in relation to the snapshotting function, including: an activation state value of the snapshotting function (e.g., "active" when a snapshot has been initiated but not yet restored, and "non-active" otherwise"); and a snapshot-time value representing the datetime at which the most recent snapshot was initiated.

In some embodiments, the DSA 133 implements one or more privacy or anti-tracking functions to secure the location data, and other device specific identity data stored as part of the security configuration. For example, the DSA 133 may perform a security control operation to randomize one or more values of the security configuration data, such as the location data, datetime value data, and/or data associated with the wireless connection between the DSD 100 and DSA 133. This may force the DSA 133 to reconnect to the drive 100, such as by the physical QR code scanning process described above. Device-level parameters may be defined to indicate a data randomization operation, such as for example by utilizing the same display component(s) assigned to indicate the connection state (e.g., LED-2 142*f* in FIG. 3*b*).

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each of the appended claims.

The invention claimed is:

1. A data storage device comprising:
a non-volatile storage medium configured to store user data;
a data port configured to transmit data between a host computer system and the data storage device;
a data security indicator; and
a controller configured to:
selectively control access of the host computer system to the user data based on security configuration data of the data storage device;
receive, from the host computer system, a request for a data access operation to access user data of the storage medium via the data port;
process the request and the security configuration data to determine:
one or more data-access security parameters to be indicated to the user; and
one or more corresponding indicator components of the data security indicator to perform the indication; and
in response to the request, generate an indicator control signal to cause the determined indicator components of the data security indicator to indicate the determined one or more data-access security parameters associated with the data access operation, wherein:
the one or more data-access security parameters associated with the data access operation comprises a security state of the user data; and
the security state is either:
a secure state in which the user data is logically protected; or
a non-secure state in which the user data is logically unprotected.

2. The data storage device according to claim 1, wherein:
the one or more data-access security parameters associated with the data access operation further comprises a type of data access operation; and
the type is either:
a read type in which the user data is read from the storage medium by the data access operation; or
a write type in which the user data is written to the storage medium by the data access operation.

3. The data storage device according to claim 2, wherein the data security indicator comprises:
a first indicator component indicating the security state of the user data; and
a second indicator component indicating the type of the data access operation.

4. The data storage device according to claim 1, further comprising a cryptography engine connected between the data port and the storage medium, and wherein the controller is further configured to:
in response to selectively setting the security state of the user data to the secure state:
instruct the cryptography engine to use an encryption key to perform an encryption function to selectively encrypt the user data; and
in response to selectively setting the security state of the user data to the non-secure state:
instruct the cryptography engine to use a decryption key to perform a decryption function to selectively decrypt the user data.

5. The data storage device according to claim 1, wherein the controller is further configured to:
receive a request for a security control operation from a device security application executing, at least partially, on a processor of an external device;
process the received request to:
store, retrieve or update one or more values of the security configuration data of the data storage device; and
determine:
one or more device-level security parameters to be indicated to a user; and
a corresponding indicator component of the data security indicator to perform the indication; and
generate an indicator control signal to cause the determined indicator component to indicate the determined one or more device-level security parameters.

6. The data storage device according to claim 5, wherein the data storage device is configured to communicate with the device security application of the external device via a secure wireless communication channel.

7. The data storage device according to claim 6, wherein the determined one or more device-level security parameters include one or more of:
an access state of the data storage device;
a connection state of the secure wireless communication channel; and an activation state of one or more security functions of the device security application with respect to the data storage device.

8. The data storage device according to claim 7, wherein the one or more security functions of the data storage device comprise:
   a location sharing function configured to transmit location data of the data storage device to the external device; and
   a data protection function configured to generate record data representing utilization of the storage medium of the device.

9. The data storage device according to claim 1, wherein the data security indicator includes one or more display components configured to visually represent at least one security parameter.

10. The data storage device according to claim 9, wherein the security configuration data includes a display component mapping assigning the at least one security parameter to a corresponding display component, such that the corresponding display component visually represents values of at least one security parameter.

11. The data storage device according to claim 9, wherein the one or more display components are configured to:
   display an element indicating a value of a represented security parameter; and
   change the displayed element in response to a voltage applied to the display component.

12. The data storage device according to claim 11, wherein the generation of the indicator control signal by the controller comprises:
   determining the value of the represented security parameter;
   determining an indication element corresponding to the represented security parameter based on a mapping of, at least, a set of possible security parameter values to associated discrete values with corresponding elements; and
   determining a voltage to apply to the display component to change the displayed element to the indication element.

13. The data storage device according to claim 12, wherein the data storage device further comprises an indicator control circuit configured to control operation of the one or more display components to indicate the represented security parameters for an indication duration.

14. The data storage device according to claim 13, wherein the controller is further configured to set the indication duration of a data access operation to be shorter than the indication duration of a security control operation.

15. The data storage device according to claim 13, wherein:
   the display component is a light emitting diode (LED) configured to selectively display one or more colors;
   the indicator control circuit is further configured to, in response to receiving the generated indicator control signal:
      apply the determined voltage to the LED to change a displayed color of the LED to an indication color; and
      cease application of the determined voltage to the LED after a lapsing of the indication duration;
   the indication duration is a period of time commencing on the change of the displayed color to the indication color; and
   the indicator control circuit is further configured to, responsive to cessation of the application of the determined voltage to the LED, cause the LED to assume an off state in which no color is displayed.

16. The data storage device according to claim 15, wherein:
   the indicator control circuit is further configured to, responsive to cessation of the application of the determined voltage to the LED, apply a pre-specified voltage to cause the LED to change the displayed color to an auxiliary color; and
   the auxiliary color does not correspond to any color of the set of possible security parameter values.

17. The data storage device according to claim 13, wherein:
   the display component is a surface having an electrochromic material configured change the displayed element by changing a color of the surface in response to a voltage applied to the electrochromic material to indicate the value of the represented security parameter; and
   the indicator control circuit is further configured to:
      apply the determined voltage to the electrochromic material to change a displayed color of the surface to an indication color; and
      cease application of the voltage to the electrochromic material after change of the color of the surface to the indication color, such that the surface is configured to retain the indication color after cessation of the application of the voltage.

18. The data storage device according to claim 12, wherein:
   the display component is a display panel configured to display an electronic label on a substrate in response to a voltage applied to one or more regions of the substrate; and
   the electronic label indicates the value of the represented security parameter.

19. A data storage device comprising:
   means for storing user data;
   means for transmitting data between a host computer system and the data storage device;
   means for indicating a set of parameters, wherein:
      the means for indicating the set of parameters includes one or more display components configured to visually represent at least one security parameter; and
      the one or more display components are configured to:
         display an element indicating a value of a represented security parameter; and
         change the displayed element in response to a voltage applied to the display component;
   means for selectively controlling access of the host computer system to the user data based on security configuration data of the data storage device; and
   means for, in response to the occurrence of one or more operations, generating an indicator control signal to cause the means for indicating a set of parameters to indicate one or more security parameters associated with the one or more operations, wherein the one or more operations are any of:
      (i) a data access operation requested or performed, by the host computer system, on the data storage device to access the means for storing user data via the means for transmitting data between a host computer system and the data storage device; and
      (ii) a security control operation requested or performed, by an external device, on the data storage device to store, retrieve or update the security configuration data of the data storage device.

20. A method for providing security indications of a data storage device, the method executed by a controller of the data storage device and comprising:
- selectively controlling access of a host computer system to user data stored on a non-volatile storage medium of the data storage device based on security configuration data of the data storage device;
- receiving a request for a security control operation from a device security application executing, at least partially, on a processor of an external device;
- processing the received request to:
  - store, retrieve or update one or more values of the security configuration data of the data storage device; and
  - determine:
    - one or more device-level security parameters to be indicated to a user; and
    - a corresponding indicator component of a data security indicator of the data storage device to perform the indication; and
- in response to processing the received request, generating an indicator control signal to cause the determined indicator component of the data security indicator of the data storage device to indicate the determined one or more device-level security parameters.

* * * * *